US011385772B2

(12) United States Patent
Masuda et al.

(10) Patent No.: US 11,385,772 B2
(45) Date of Patent: Jul. 12, 2022

(54) ATTRIBUTE-BASED RULES FOR DISPLAYING ADDITIONAL INFORMATION

(71) Applicant: Nippon Telegraph and Telephone Corporation, Tokyo (JP)

(72) Inventors: Takeshi Masuda, Tokyo (JP); Akira Kataoka, Tokyo (JP); Hajime Nakajima, Tokyo (JP); Makoto Komiyama, Tokyo (JP); Hidetaka Koya, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/254,980

(22) PCT Filed: Jun. 18, 2019

(86) PCT No.: PCT/JP2019/024168
§ 371 (c)(1),
(2) Date: Dec. 22, 2020

(87) PCT Pub. No.: WO2020/004156
PCT Pub. Date: Jan. 2, 2020

(65) Prior Publication Data
US 2021/0271355 A1 Sep. 2, 2021

(30) Foreign Application Priority Data

Jun. 29, 2018 (JP) .............................. JP2018-125360

(51) Int. Cl.
*G06F 3/0483* (2013.01)
*G06F 16/958* (2019.01)
*G06F 8/38* (2018.01)

(52) U.S. Cl.
CPC .............. *G06F 3/0483* (2013.01); *G06F 8/38* (2013.01); *G06F 16/986* (2019.01); *G06F 2203/04803* (2013.01)

(58) Field of Classification Search
CPC ........ G06F 3/0483; G06F 3/0481; G06F 8/38; G06F 16/986; G06F 2203/04803
See application file for complete search history.

(56) References Cited

U.S. PATENT DOCUMENTS 7,386,835 B1 * 6/2008 Desai ...................... G06F 9/451
717/107
8,464,148 B1 * 6/2013 Wichary ............... G06F 16/958
715/255

(Continued)

FOREIGN PATENT DOCUMENTS

| JP | 2008-146586 | 6/2008 |
| JP | 2011-100200 | 5/2011 |
| JP | 2015-191504 | 11/2015 |

OTHER PUBLICATIONS

Diaz et al. A Language for End-User Web Augmentation: Caring for Producers and Consumers Alike. ACM Transactions on the Web, vol. 7, No. 2, Article 9, Publication date: May 2013. DOI: http://dx.doi.org/10.1145/2460383.2460388. 51 pages. (Year: 2013).*

(Continued)

*Primary Examiner* — Amy M Levy
(74) *Attorney, Agent, or Firm* — Fish & Richardson P.C.

(57) ABSTRACT

A storage unit stores a rule for specifying additional information to be displayed for each operation scene identified with a combination of states of DOM elements of a predetermined web page being represented by presence/absence or attribute values. A rule interpretation execution unit monitors the states of the DOM elements of the predetermined web page, and causes the storage unit to store the states as a context board. The rule interpretation execution (Continued)

unit displays, if states of the operation scene matching states of the context board stored in the storage unit, the additional information specified with the rule.

15 Claims, 32 Drawing Sheets

(56) References Cited

U.S. PATENT DOCUMENTS

| | | | | |
|---|---|---|---|---|
| 9,582,488 | B2* | 2/2017 | Di Blas | G06F 40/226 |
| 2003/0149799 | A1* | 8/2003 | Shattuck | G06F 9/4492 |
| | | | | 719/318 |
| 2004/0189708 | A1* | 9/2004 | Larcheveque | G06F 40/226 |
| | | | | 715/780 |
| 2004/0226002 | A1* | 11/2004 | Larcheveque | G06F 16/84 |
| | | | | 717/126 |
| 2006/0004729 | A1* | 1/2006 | Zhilyaev | G06F 40/226 |
| 2008/0147841 | A1* | 6/2008 | Nishino | H04L 67/02 |
| | | | | 709/223 |
| 2009/0083617 | A1* | 3/2009 | Hironiwa | G06F 40/174 |
| | | | | 715/222 |
| 2015/0281334 | A1 | 10/2015 | Ushiki et al. | |
| 2016/0044083 | A1* | 2/2016 | Galloway | H04L 67/32 |
| | | | | 709/217 |
| 2016/0140338 | A1* | 5/2016 | Walters | G06F 21/31 |
| | | | | 726/22 |
| 2017/0163690 | A1* | 6/2017 | Graham | G06F 21/554 |
| 2017/0277625 | A1 | 9/2017 | Shtuchkin et al. | |
| 2019/0303269 | A1* | 10/2019 | Arieli | G06F 11/3672 |
| 2020/0081593 | A1* | 3/2020 | Nasson | G06F 3/0486 |

OTHER PUBLICATIONS

Ito et al., "SmartCourier: An Annotation System for Adaptive Information Sharing," The Japanese Society for Artificial Intelligence, 2002, 17(3):301-312, 34 pages (with English Translation).

Kato et al., "Development of an Information-Sharing Support System using Web-based Annotation," 2005 Industrial Research Institute of Ishikawa, Research Report, 2005, 55: 9 pages (with English Translation).

Kawabata et al., "Annotation Display and Editing Technology of Directly Displaying Operation Know-How on Operation Screen," NTT Technology Journal, 2015, 27(7):36-39, 8 pages (with English Translation).

Nishikawa et al., "A Method for Attaching Additional Functionalities onto Web-based OSS User Interfaces," Institute of Electronics, Information and Communication Engineering, Technical Report, 2016, 116(124):63-68, 16 pages (with English Translation).

W3.org, [online], "Web Annotation Working Group," 2010, retrieved on Apr. 25, 2018, retrieved from URL<http://www.w3.org/annotation/>, 8 pages.

* cited by examiner

FIG.4

```
{
  "conditions":[{
      "id":"E940185E-0878-4D1E-8219-B8CD007C13EA_0001",
      "parentids":[],
      "url ":["http://www.ntt.co.jp"],
      "title":"NTT OFFICIAL HOMEPAGE",
      "selector":"P#HdLogoGrp"
   },{
      "id":"E940185E-0878-4D1E-8219-B8CD007C13EA_0002",
      "parentids":["E940185E-0878-4D1E-8219-B8CD007C13EA_0001"],
      "url ":["http://www.ntt.co.jp"],
      "title":"NTT OFFICIAL HOMEPAGE",
      "selector":"A",
      "option":{"type":"text", "value":"CHINESE"}
   },{
      "id":"E940185E-0878-4D1E-8219-B8CD007C13EA_0003",
      "parentids":["E940185E-0878-4D1E-8219-B8CD007C13EA_0001"],
      "url":["http://www.ntt.co.jp", "http://www.ntt.co.jp/frame1.html"],
      "title":"NTT OFFICIAL HOMEPAGE INTERNAL FRAME",
      "selector":"P",
      "option":{"type":"text", "value":"TESTTEST"}
   }],
  "windownodes":[{
      "url ":["http://www.ntt.co.jp"],
      "title":"NTT OFFICIAL HOMEPAGE",
      "annotations":[{"conditionlist":" E940185E-0878-4D1E-8219-B8CD007C13EA_0002 ",
                      "presentation":{"color":"#00FFFF", "size":"30", "type":"circle", ...}}]
   },{
      "url":["http://www.ntt.co.jp", "http://www.ntt.co.jp/frame1.html"],
      "title":"NTT OFFICIAL HOMEPAGE INTERNAL FRAME",
      "annotations":[{"conditionlist":"E940185E-0878-4D1E-8219-B8CD007C13EA_0003 ",
                      "presentation":{"color":"#FF00FF", "size":"35", "type":"rect", ...}}]
   }]
}
```

GUI CONDITION PART SETTING PANEL

STATIC ATTRIBUTE
- ☑ tag  BODY
- ☐ id   1
- ☐ name body

DYNAMIC ATTRIBUTE
- (5) ☐ value  3
- (6) ☐ text   BODY (7) EDIT
(8) EDIT
(9) EDIT (b)

| No. | TAG | | UI CONTROL (EVALUATION CONDITION AND PRESENTATION SETTING PANEL (IDENTIFICATION INFORMATION)) | | | | |
|---|---|---|---|---|---|---|---|
| | | | (5) VALUE USE SETTING ITEM | (6) TEXT USE SETTING ITEM | (7) TAG EDIT BUTTON | (8) VALUE EDIT BUTTON | (9) TEXT EDIT BUTTON |
| 1 | input | | SWITCH CONTROL ACCORDING TO TYPE. | | | | |
| 2 | | text | ○ | × | × | ○ | × |
| 3 | | search | ○ | × | × | ○ | × |
| 4 | | tel | ○ | × | × | ○ | × |
| 5 | | email | ○ | × | × | ○ | × |
| 6 | | url | ○ | × | × | ○ | × |
| 7 | | datetime | ○ | × | × | ○ | × |
| 8 | | datetime-local | ○ | × | × | ○ | × |
| 9 | | date | ○ | × | × | ○ | × |
| 10 | | month | ○ | × | × | ○ | × |
| 11 | | week | ○ | × | × | ○ | × |
| 12 | | time | ○ | × | × | ○ | × |
| 13 | | number | ○ | × | × | ○ | × |
| 14 | | range | ○ | × | × | ○ | × |
| 15 | | color | ○ | × | × | ○ | × |
| 16 | | checkbox | ○ | ○ | ○ | ○ | × |
| 17 | | radio | ○ | ○ | ○ | ○ | × |
| 18 | | OTHERS | ○ | ○ | × | ○ | ○ |
| 19 | textarea | | × | × | × | × | ○ |
| 20 | select | | × | × | × | × | × |
| 21 | OTHERS | | ○ | × | × | ○ | ○ |

FIG.17

FIG.19

ATTRIBUTE-BASED RULES FOR DISPLAYING ADDITIONAL INFORMATION

CROSS-REFERENCE TO RELATED APPLICATIONS

This application is a National Stage application under 35 U.S.C. § 371 of International Application No. PCT/JP2019/024168, having an International Filing Date of Jun. 18, 2019, which claims priority to Japanese Application Serial No. 2018-125360, filed on Jun. 29, 2018. The disclosure of the prior application is considered part of the disclosure of this application, and is incorporated in its entirety into this application.

TECHNICAL FIELD

The present invention relates to a display control apparatus, a display control method, and a display control program.

BACKGROUND ART

An annotation technology, whereby an electronic sticky note is attached to an operation screen without modifying an application of an existing system so as to display information necessary for a user of the application, has hitherto been known (see NPLs 1 to 5).

CITATION LIST

Non Patent Literature

NPL 1: "Web Annotation Working Group", [online], 2014, W3C Web Annotation Working Group, [searched on Apr. 25, 2018], Internet <URL:http://www.w3.org/annotation/>
NPL 2: Sadanori I to, et al., "SmartCourier: Adaptive Information Sharing Environment through Annotation", the Japanese Society for Artificial Intelligence, vol. 17, no. 3 (2002), pp. 301-312, 2002
NPL 3: Naotaka Kato, et al., "Development of Information Sharing System Using Electronic Memo on Homepage", Industrial Research Institute of Ishikawa, 2005, research report 55 (2005), 2005
NPL 4: Kenichi Nishikawa, et al., "Method of Enhancing User Interface for Web-Based Operation System", technical report of the Institute of Electronics, Information and Communication Engineers, vol. 116, no. 124, ICM 2016-19, pp. 63-68, July 2016
NPL 5: Yuto Kawabata, et al., "annotation display and editing technology of directly displaying operation know-how on operation screen". NTT technology journal 27(7), pp. 36-39, July 2015

SUMMARY OF THE INVENTION

Technical Problem

However, in the annotation technology in the related art, only an operation screen with a fixed layout is supported. Thus, in a case of using a layout without reloading of a web page and in which a Document Object Model (DOM) structure is changed, forcible automatic update of annotation display cannot be performed in each operation scene, and in some cases annotation information is not appropriately updated. Definition of practical operation scenes for performing annotation display is complicated, and thus it is difficult for a general user not having programming skills to create such definition.

The present invention is made in view of the circumstances as described above, and has an object to easily perform definition of an operation scene for performing annotation display and to update annotation display appropriately according to a change of the operation scene.

Means for Solving the Problem

To solve the problems described above and to achieve the object, a display control apparatus according to the present invention includes: a storage unit configured to store a rule for specifying additional information to be displayed for each operation scene identified with a combination of states of DOM elements of a predetermined web page being represented by presence/absence or attribute values; a monitor unit configured to monitor the states of the DOM elements of the predetermined web page, and cause the storage unit to store the states as a context board: and a display control unit configured to display, if states of the operation scene match states of the context board stored in the storage unit, the additional information specified with the rule.

Effects of the Invention

According to the present invention, definition of an operation scene for performing annotation display can be easily performed and annotation display can be updated appropriately according to a change of the operation scene.

BRIEF DESCRIPTION OF DRAWINGS

FIG. 4 is a diagram illustrating an implementation example of a rule.
FIG. 11 is an explanatory diagram for describing processing of the editing unit.

FIG. 17 is an explanatory diagram for describing an example of display control processing performed by the display control apparatus.

FIG. 19 is an explanatory diagram for describing the example of display control processing performed by the display control apparatus.

DESCRIPTION OF EMBODIMENTS

One embodiment of the present invention will be described below in detail with reference to the drawings. Note that the present invention is not limited by the embodiment. In the annotations of the drawings, the same parts are denoted by the same reference signs.

Configuration of Display Control Apparatus

Figure 1:
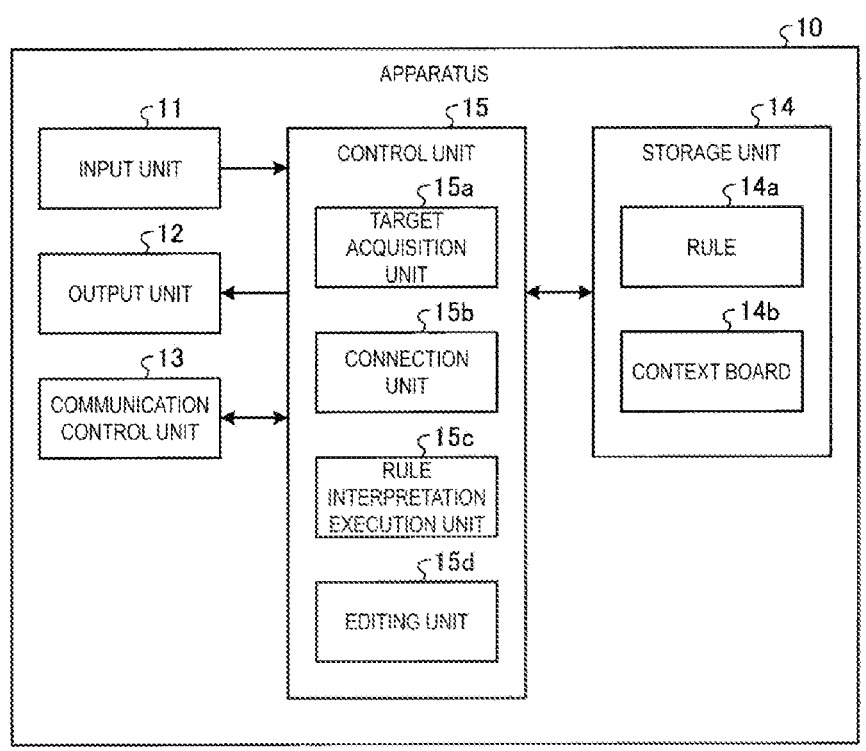
FIG. 1 is a schematic diagram illustrating a schematic configuration of a display control apparatus according to the present embodiment.
Figure 2:
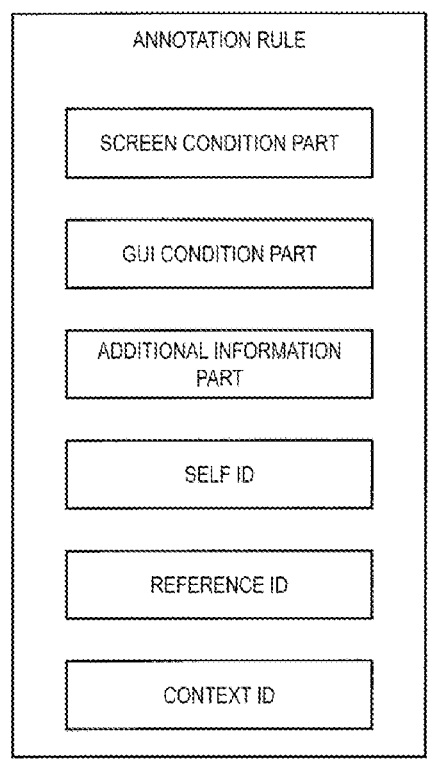
FIG. 2 is an explanatory diagram for describing data configuration of a rule.

FIG. 1 is a schematic diagram illustrating an example of a schematic configuration of a display control apparatus 10. As illustrated in FIG. 2, the display control apparatus 10 according to the present embodiment is implemented with a general-purpose computer such as a workstation and a personal computer, and includes an input unit 11, an output unit 12, a communication control unit 13, a storage unit 14, and a control unit 15.

The input unit 11 is implemented by using an input device such as a keyboard and a mouse, and inputs various pieces of command information, such as processing start, to the control unit 15 in response to input operation of an operator. The output unit 12 is implemented by a display apparatus such as a liquid crystal display, a printing apparatus such as a printer, an information communication apparatus, or the like. The communication control unit 13 controls communication with an external apparatus such as a network apparatus via an electric communication line such as a local area network (LAN) and the Internet.

The storage unit 14 is implemented by a random access memory (RAM), a semiconductor memory element such as a flash memory, or a storage apparatus such as a hard disk and an optical disc. Note that the storage unit 14 may communicate with the control unit 15 via an electric communication line such as a LAN and the Internet. In the present embodiment, the storage unit 14 stores a rule 14a and a context board 14b.

The rule 14a is information for specifying additional information to be displayed for each operation scene that is identified with a combination of states of DOM elements of a predetermined web page represented by presence/absence or attribute values. Specifically, the rule 14a is information for specifying additional information to be displayed at a nearby position to a predetermined DOM element in an operation scene that is identified with a combination of states of DOM elements of a predetermined web page.

Here, in the present embodiment, the states of the DOM elements are represented by presence/absence or attribute values of the DOM elements. The operation scene is identified with a combination of states of DOM elements. For example, an operation scene in which a predetermined label such as "discontinuance request" is present in a table element of a certain panel, a subsequent operation scene in which an attribute value such as "service A" is input to a field for specifying service, or the like is identified.

Figure 3:
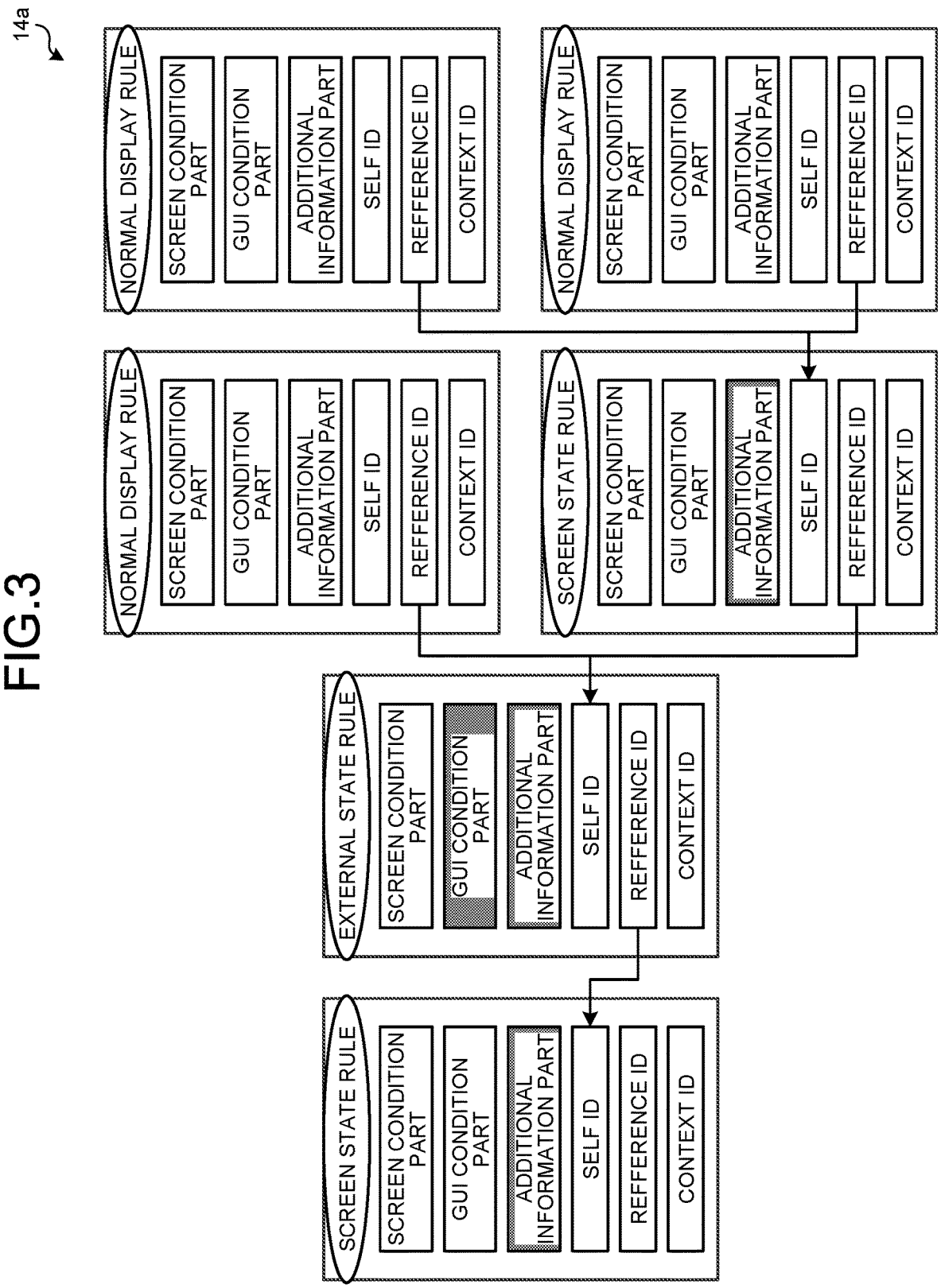
FIG. 3 is an explanatory diagram for describing data configuration of rules.

FIG. 2 and FIG. 3 are each an explanatory diagram for describing data configuration of the rule 14a. As illustrated in FIG. 3, the rule 14a is represented in a tree structure with the annotation rule illustrated in FIG. 2 being a node.

First, as illustrated in FIG. 2, the annotation rule being anode of the rule 14a includes a screen condition part, a graphical user interface (GUI) condition part, an additional information part, an self ID, a reference ID, and a context ID. The screen condition part represents a condition of identifying a web page to be a target of a rule. For example, regarding a URL of a web page, conditions such as complete match, partial match, or regular expression match with respect to a specific text are set. Here, information of a title, published time, or the like of a web page may be included.

The GUI condition part represents a condition for specifying a state of a DOM element to be target of additional information specified by a rule. The GUI condition part may include a condition that an attribute value of a DOM element has a predetermined value as well as selector specification of specifying a DOM element.

The additional information part is information for specifying presentation settings of additional information (hereinafter also referred to as annotation) to be displayed for a DOM element specified in the GUI condition part. For example, when a DOM element is present in a web page, overlay display for additional information at a nearby position on a screen of the DOM element is specified.

Here, JavaScript (registered trademark) code or the like describing display control of a display element of an annotation icon or tips, interaction (dialogue operation), or the like may be included. For example, interaction refers to a behavior of the GUI of displaying annotation tips or the like when a user clicks on an annotation icon with a mouse.

The self ID is information for identifying an annotation rule. The context ID is information for identifying a DOM element that is identified in the GUI condition part of the annotation rule. The reference ID is, as illustrated in FIG. 3, refers to an self ID of a parent node when the rule 14a of a tree structure with each annotation rule being a node is constructed.

As illustrated in FIG. 3, the rule 14a identifies an operation scene (which may be hereinafter referred to as a context) by embodying various branching conditions by combining simple relationships such as a logic expression (AND/OR) and a constraint condition (N-set constraint), with the use of the parent-child relationship of the annotation rules.

For example, an operation scene in which an attribute value such as "service A" is input to a field for specifying service on a panel in which a predetermined label such as "discontinuance request" is present in a table element of a certain panel is identified by the rule 14a. The rule 14a for specifying additional information to be displayed in that case can be set. In this manner, the rule 14a can specify additional information to be displayed in each of various operation scenes.

Note that, in FIG. 3, as the annotation rules, a normal display rule including an additional information part, a screen state rule not including an additional information part, and an external state rule not including an additional information part and a GUI condition part are illustrated. The additional information part of the screen state rule and the additional information part and the GUI condition part of the external state rule are hatched.

The external state rule is an annotation rule representing a condition of identifying only a web page to be a target of a rule. The screen state rule is an annotation rule of identifying only a state of a DOM element of a web page to be a target of a rule.

In FIG. 3, the additional information part is set only in an annotation rule serving as a leaf of the tree structure of the rule. In this manner, additional information to be displayed in an operation scene identified in the rule 14a is specified.

FIG. 4 is a diagram illustrating an implementation example of the rule 14a. In FIG. 4, "conditions" stores condition rules, specifically, all the types of a screen state rule, an external state rule, and a normal display rule. "windownodes" stores additional information parts of a plurality of normal display rules. All of these pieces of information correspond to the annotation rule. The part A is classified into a condition rule not including an additional information part, such as a screen state rule and an external state rule. Specifically, the part A is not referred to by "annotation". Note that the part A includes "selector" specification, and thus specifically corresponds to a screen state rule. The part B corresponds to a normal display rule including an additional information part. Here, "parentids" indicates reference of another rule. In this manner, a tree structure among condition rules is expressed.

Note that, FIG. 4 is different from the configuration illustrated in FIG. 2 and FIG. 3 in that the additional information parts of the annotation rule are separated, "parentids" stores a plurality of elements, and selector specification of specifying a DOM element is separated into "selector" and "option". Except for those described above, FIG. 4 is the same as the configuration illustrated in FIG. 2 and FIG. 3.

The rule 14a may further include a state external to a web page in the operation scene. Specifically, the rule 14a may include an annotation rule specified with a predetermined attribute value regarding the outside of a web page being a condition. In this manner, as will be described later, for example, using a condition that time acquired from outside of a web page has reached predetermined time, annotation can be displayed at a scheduled time.

A description will be given with reference to FIG. 1 again. The context board 14b is information representing a state of a DOM element of a web page displayed for a user, as will be described later. A rule interpretation execution unit 15c as a monitor unit to be described later causes the context board 14b to be stored in the storage unit 14.

The control unit 15 is implemented in a central processing unit (CPU) or the like. The control unit 15 executes a processing program stored in memory, and as illustrated in FIG. 2, functions as a target acquisition unit 15a, a connection unit 15b, a rule interpretation execution unit 15c, and an editing unit 15d. Note that each or a part of these function units may be implemented in different pieces of hardware.

The target acquisition unit 15a acquires a web page to be a target of processing.

Specifically, the target acquisition unit 15a acquires a list of web pages of a web browser from the API of an OS of a PC terminal. Specifically, the target acquisition unit 15a acquires a list of web pages by means of polling. When the target acquisition unit 15a identifies a web page that matches the screen condition part of each annotation rule constituting the rule 14a, the target acquisition unit 15a gives a notification to the connection unit 15b.

The connection unit 15b injects the rule 14a and the rule interpretation execution unit 15c to be described later in the web page identified by the target acquisition unit 15a. The connection unit 15b controls communication between the rule interpretation execution unit 15c and an annotation engine being a function unit other than the control unit 15.

For example, when a web browser is Internet Explorer (IE) (registered trademark) of Windows (registered trademark), for communication from JavaScript to C#, it is only necessary that an interface in C# be registered in a namespace in JavaScript in IE by using MSHTML This enables execution of the interface in C# in a manner of calling a JavaScript function from JavaScript.

In communication from C# to JavaScript, a JavaScript function in IE can be called from C#. In this case, communication is basically non-synchronous communication, and thus processing results can be acquired with a call back function from JavaScript in a non-synchronous manner.

The rule interpretation execution unit 15c functions as a monitor unit for a web page. Specifically, the rule interpretation execution unit 15c monitors states of DOM elements of a web page, and causes the storage unit 14 to store the states as the context board 14b. Specific operation is as follows. The rule interpretation execution unit 15c is implemented in JavaScript residing in a web page. The rule interpretation execution unit 15c monitors events of changes of a DOM structure of a web page, and updates the context board 14b.

Figure 5:
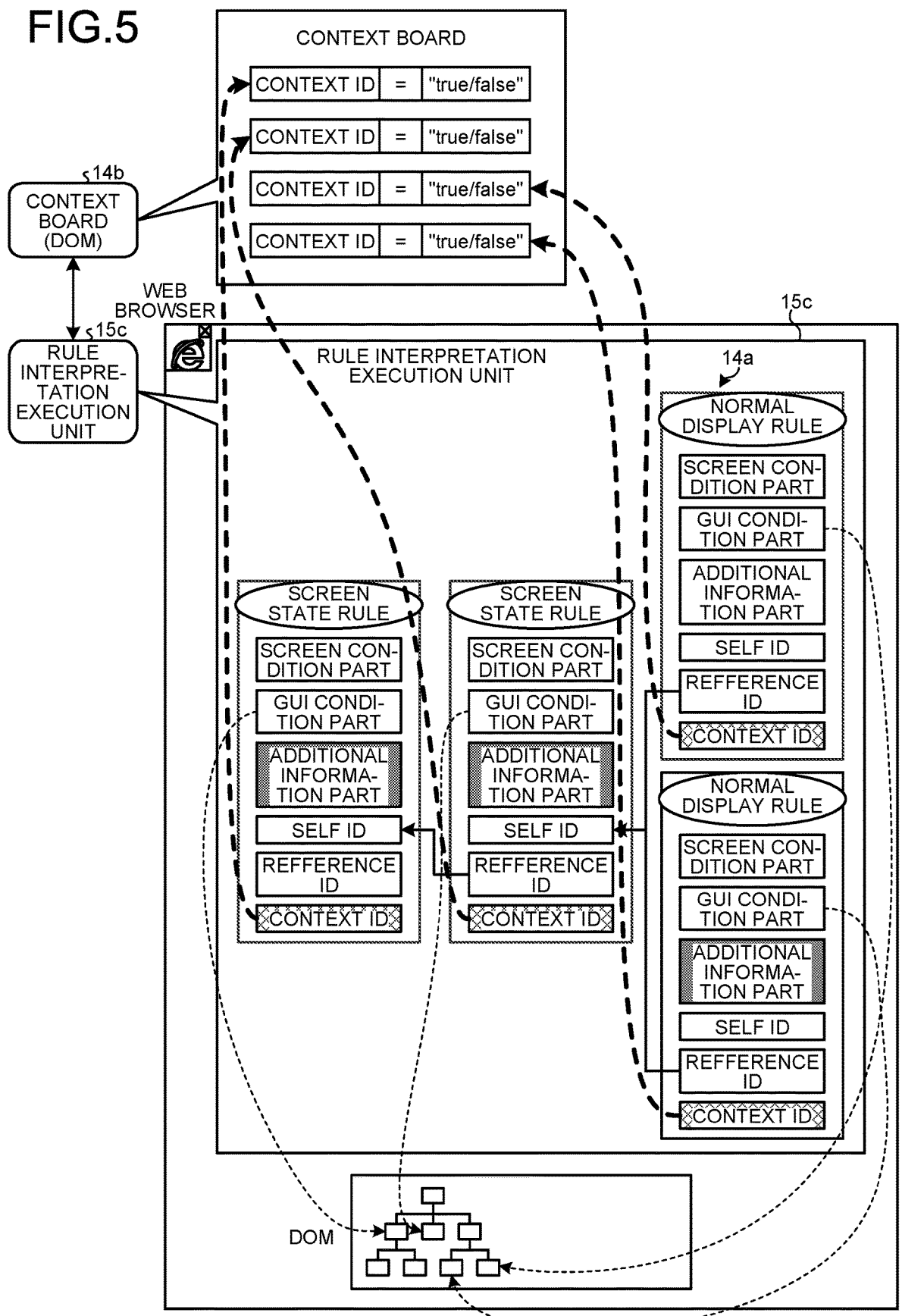
FIG. 5 is an explanatory diagram for describing a context board.
Figure 6:
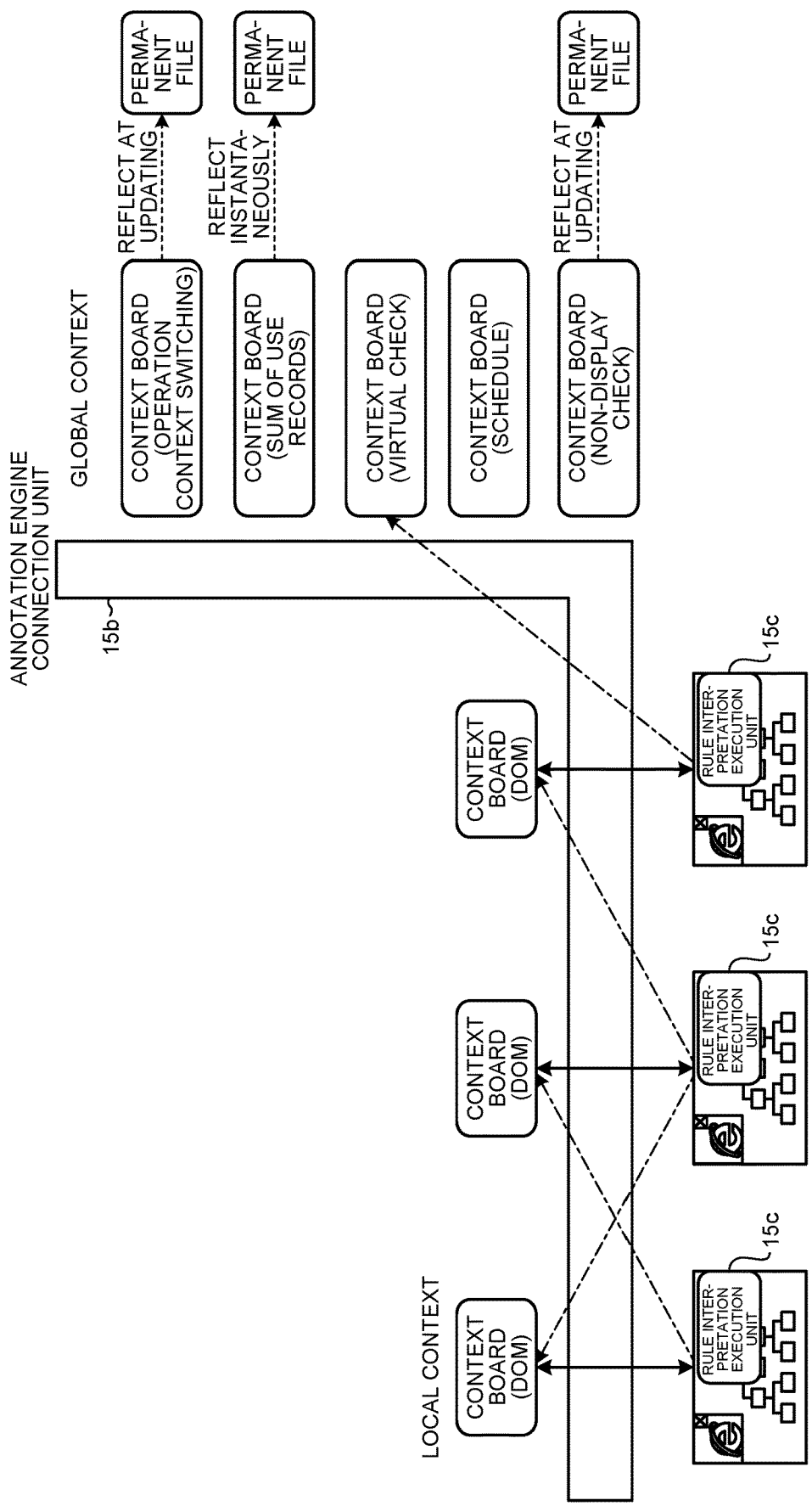
FIG. 6 is an explanatory diagram for describing a context board.
Figure 7:
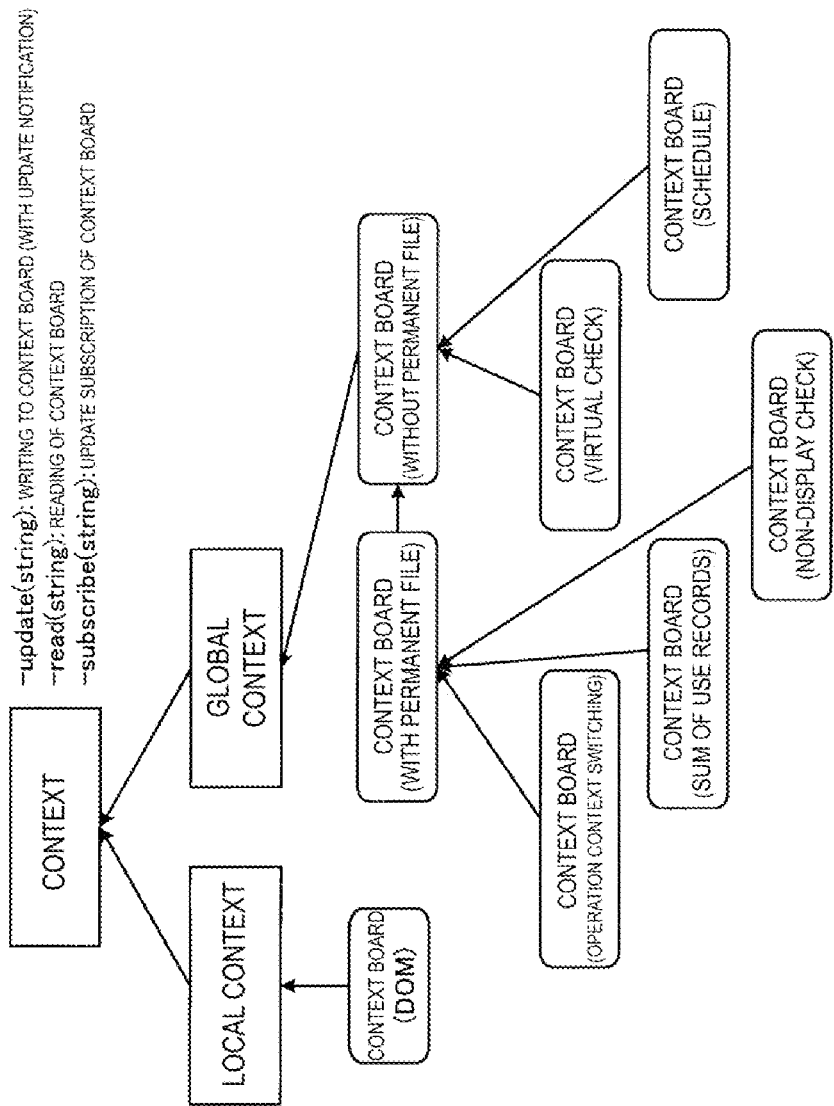
FIG. 7 is an explanatory diagram for describing a context board.

Here, FIG. 5 to FIG. 7 are each an explanatory diagram for describing the context board 14b. First, as illustrated in FIG. 5, regarding each of the DOM elements, the rule interpretation execution unit 15c generates an object representing its state for the context board 14b. Here, the DOM element is a DOM element identified with the GUI condition part of each annotation rule constituting the rule 14a. Each object is identified with the context ID described above.

In the context board 14b, a state of a DOM element is represented with evaluation results for each annotation rule. Evaluation of a state of a DOM element refers to comparison with a state identified with the annotation rule. Specifically, as the evaluation results, "True" is set in a case of matching a state identified in the GUI condition part of each annotation rule, and "False" is set in a case of not matching.

When a state of a DOM element of a web page is changed, the rule interpretation execution unit 15c performs evaluation of comparing the state of the DOM element with a state identified in the annotation rule. Then, the rule interpretation execution unit 15c performs update of changing a set value of "True" or "False" of the object if necessary.

Note that, when an operation scene of the rule 14a includes a state external to a web page, the control unit 15 further monitors the state external to the web page as a monitor unit different from the target acquisition unit 15a. Specifically, the rule interpretation execution unit 15c generates an object representing a state outside a web page for the context board 14b by using a context ID allocated for a state outside the web page in the rule 14a. The rule interpretation execution unit 15c sets evaluation results for the annotation rule specified with a predetermined attribute value of outside of a web page being a condition.

In this manner, the context board 14b can also be used for monitoring of a condition of information outside a web page, as well as monitoring of a state of a DOM element of a web page. For example, FIG. 6 illustrates a use example of the context board 14b. In FIG. 6, a local context refers to a context board 14b for monitoring a state of a DOM element of a web page, and is referred to as a "context board (DOM)". The "context board (DOM)" is present for each web page.

In FIG. 6, as a global context, a context board 14b to be used for monitoring of information outside a web page is illustrated. For example, the context board (operation context switching) represents the context board 14b to be used when annotation is switched by having a user select operation explicitly.

In this case, an annotation engine receives selection of operation by a user by using the GUI. The rule interpretation execution unit 15c generates an object representing a state of selection of operation by a user for the context board (operation context switching), and sets evaluation results for the annotation rule specified with a predetermined operation being a condition. Note that, in the context board (operation context switching), when evaluation results are updated, evaluation results before update are stored in a permanent file as a history.

The context board (sum of use records) represents the context board 14b used when actual records of display of annotation are summed. In this case, the rule interpretation execution unit 15c generates an object representing a display condition of an icon or a sticky note for the context board (sum of use records), and sets display/non-display. Note that, in the context board (sum of use records), when display/non-display is changed, settings before change is stored in a permanent file as a history.

The context board (virtual check) represents the context board 14b used when annotation is switched according to a state of a distant time point in time series. For example, the annotation engine uses annotation with a check box as a virtual check sheet, and receives input of a user indicating that a state of a distant time point in time series has been confirmed. For example, the annotation engine receives input of a user indicating that input of a plurality of items has been performed has been confirmed.

The rule interpretation execution unit 15c generates an object representing a check state of a check item of a virtual check sheet for the context board (virtual check), and sets evaluation results for the annotation rule specified with a predetermined check state of a virtual check sheet being a condition.

The context board (schedule) represents the context board 14b used when for example, time of a PC is monitored as a state of an outside system described above, and annotation is displayed in a period registered in a schedule. In this case, the rule interpretation execution unit 15c generates an object representing internal time of a PC, and sets evaluation results for the annotation rule specified with predetermined time being a condition.

The context board (non-display check) represents the context board 14b used when the second or later annotation display for a user is switched to non-display. For example, the annotation engine receives command input of a user to change the second or later annotation to non-display by using annotation with a check box for specifying "do not display again".

In this case, the rule interpretation execution unit 15c as a monitor unit generates an object representing a check state of this annotation for the context board (non-display check), and sets evaluation results for the annotation rule specified with a checked check box being a condition. Note that, in the context board (non-display check), when evaluation results are updated, evaluation results before update are stored in a permanent file as a history. In this manner, evaluation results reflecting the command input of the user "do not display again" can be continuously used even after the next and later launch.

FIG. 7 illustrates a class hierarchical diagram in which various context boards 14b described above are classified. As illustrated in FIG. 7, the context board 14b is classified into two abstract classes, that is, a local context and a global context. The local context includes the context board (DOM) as described above.

The global context is further classified depending on presence/absence of a permanent file. In the example illustrated in FIG. 6, the context board (with a permanent file) includes the context board (operation context switching), the context board (sum of use records), and the context board (non-display check) as described above. The context board (with a permanent file) is the context board 14b in which a permanent file is generated. The context board (without a permanent file) includes the context board (virtual check) and the context board (schedule). The context board (without a permanent file) is the context board 14b in which a permanent file is not generated.

Note that all of these context boards have three methods, that is, update (string), read (string), and subscribe (string). The update (string) refers to writing of a state value in the context board (with update notification). The read (string) refers to reading of a state value from the context board. The subscribe (string) refers to update subscription of a state value of the context board.

It is also possible to arrange the context boards of the global context to serve as various types of modules including various functions. For example, the context board (schedule) may monitor a state outside a web page by itself without depending on the function of the monitor unit by the control unit 15 described above. Specifically, a function of reading time information of a PC terminal is regularly called inside the context board (schedule). The context board (with a permanent file) already has a function of writing information that context board (with a permanent file) stores in a file at appropriate timing. In this manner, despite being included in the storage unit 14, the context board can autonomously perform monitoring, maintaining permanence, or the like of an information range that the context board is in charge of.

Consequently, when an information range handled as the global context is newly added to the configuration of the present invention, there is an advantage in that only adding and developing of a context board including a function of a corresponding information range as a module, instead of making a modification of the control unit 15.

A description will be given with reference to FIG. 1 again. The rule interpretation execution unit 15c functions as a display control unit. Specifically, the rule interpretation execution unit 15c displays, if states of an operation scene of the rule 14a match states of the context board 14b stored in the storage unit 14, additional information specified in the rule 14a. Here, when a state of a monitored DOM element is changed, the rule interpretation execution unit 15c displays, if the states of the operation scene match the stateS of the context board 14b, additional information specified in the rule 14a.

Specifically, the rule interpretation execution unit 15c refers to the context board 14b. Then, when all of the evaluation results for each annotation rule connected as parent nodes in the rule 14a of the tree structure indicate "True", the rule interpretation execution unit 15c displays additional information specified in the rule 14a. In that case, basically, the rule interpretation execution unit 15c displays additional information specified in the normal display rule being an annotation rule corresponding to a leaf of a tree in a web page. Note that operation can be performed even when a normal display rule is positioned at a branch of a tree, in terms of functional configuration.

Note that the rule interpretation execution unit 15c need not immediately perform processing of displaying additional information specified in the rule 14a in an operation scene matching the context board 14b when a state of a DOM element is changed. For example, as described above with reference to FIG. 6, switching annotation according to a state of a distant time point in time series and switching the second or later annotation display to non-display can also be performed.

Figure 8:
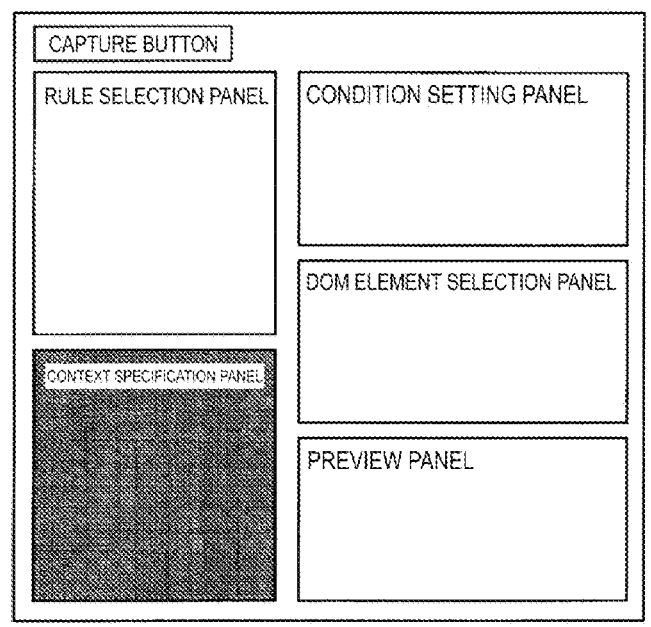
FIG. 8 is an explanatory diagram for describing processing of an editing unit.

The editing unit 15d creates or edits the rule 14a by using the GUI in which an operation scene is visualized. Here, FIG. 8 to FIG. 12 are each an explanatory diagram for describing processing of the editing unit 15d. The editing unit 15d receives creation or editing of the rule 14a by a user by using an editing screen illustrated in FIG. 8. As illustrated in FIG. 8, the editing screen includes a rule selection panel, a condition setting panel, a DOM element selection panel, a preview panel, and a context specification panel, for example.

In FIG. 8, when a user selects a capture button, the editing unit 15d captures a DOM structure inside a web page and displays the DOM structure in the DOM element selection panel.

The DOM element selection panel is used to specify a DOM element to be associated with each annotation rule. In the DOM element selection panel, for example, a rectangular figure of x. y. w. h of a DOM element is displayed, an image picture of the page is displayed on the background, and correspondence between regions of a web page and DOM elements can be visually checked.

A user can select a DOM element by using a mouse. The panel may employ a format similar to a format of a developer tool screen of IE. In addition, a user can create an annotation rule through predetermined operation. A plurality of annotation rules created on this panel are additionally displayed on the rule selection panel.

On the rule selection panel, a set of annotation rules loaded from a stored file to the editing screen are displayed. On this panel, a set of annotation rules are displayed in a list format, a table format, or a tree format based on inside information, for example. For example, the editing unit 15d may collectively form subtrees of each individual group for display for a group of annotation rules whose contents of the screen condition part are the same and a group of annotation rules whose contents of the GUI condition part are the same.

The editing unit 15d may receive specification of a search condition and perform filter display of annotation rules that match the search condition. The editing unit 15d may further receive specification of preferences, and may perform sort display of annotation rules in order based on the specified preferences. The annotation rule selected on this panel is displayed on the DOM element selection panel with emphasis, and is also displayed or displayed with emphasis on the condition setting panel and the preview panel.

The condition setting panel is used to edit the screen condition part, the GUI condition part, the additional information part, or the like of the selected annotation rule. On the preview panel, a preview image visualizing annotation display based on the additional information part of the annotation rule is displayed.

Note that the preview panel may be displayed integrally with the DOM element selection panel. For example, presentation settings such as the color and the size may be editable with the use of a mouse, in a similar manner to a graphic editor such as PowerPoint (registered trademark). A relative position of annotation such as an icon and a sticky note with respect to a target DOM element may be movable with an operation using a mouse.

On the context specification panel, a context (operation scene) configured as a composite condition of a special GUI condition is displayed. Context information is displayed with metaphor of a folder hierarchy in which files are stored and arranged. For example, folders may be limited to one hierarchy so as to avoid complexity, or hierarchical context may be used as a folder hierarchy.

Association between the contexts and the rules is implemented with an editing operation similar to an operation of storing and arranging files to folders. For example, association of contexts and rules is performed through an operation of dragging nodes from the rule selection panel and dropping the nodes in a predetermined folder of the context specification panel.

Alternatively, association of contexts and rules may be performed through an operation similar to a keyboard shortcut operation (so-called copy and paste operation).

Here, in the context specification panel, different tab panels may be used for each type of context, or different colors may be used for folder display of contexts. In the context specification panel, association of states outside a web page and rules can also be performed. In that case, the editing unit 15d may set what state of the outside is to be monitored according to a type of the external state. Specifically, to set a state to be monitored, a subdialog window may be opened from a right click menu and one may be selected from the subdialog window, or a tab panel may be provided in a condition setting panel, and one may be selected by a user in a switching manner.

The editing unit 15d may set a composite condition consisting of a combination of annotation rules illustrated in FIG. 3 with one subdialog window, or set a composite condition with one tab panel provided in a condition setting panel.

The nodes created on the context specification panel are, for example, displayed as icons with decoration of shortcuts. Alternatively, for the sake of easy grasping of the original and the alias, display may be performed so that when one is selected the other is displayed with highlight.

The original node may be displayed as an icon with decoration of a small picture of a flag or the like representing presence of context, so that it can be known that alias is associated.

When one node is associated with a plurality of contexts, the colors of flags may be changed depending on a corresponding context, or a list of associated contexts may be displayed with a balloon or a right click.

In this manner, in the context specification panel, the editing unit 15d enables editing of the rule 14a with editing metaphor different from that of the rule selection panel so as to be easily understandable to a user.

The editing unit 15d can perform editing of the rule 14a for the GUI including inline frames. In this case, each individual inline frame is identified as a web page with a different URL. In this manner, the editing unit 15d can create the rule 14a that the rule interpretation execution unit 15c can directly use.

Figure 9:
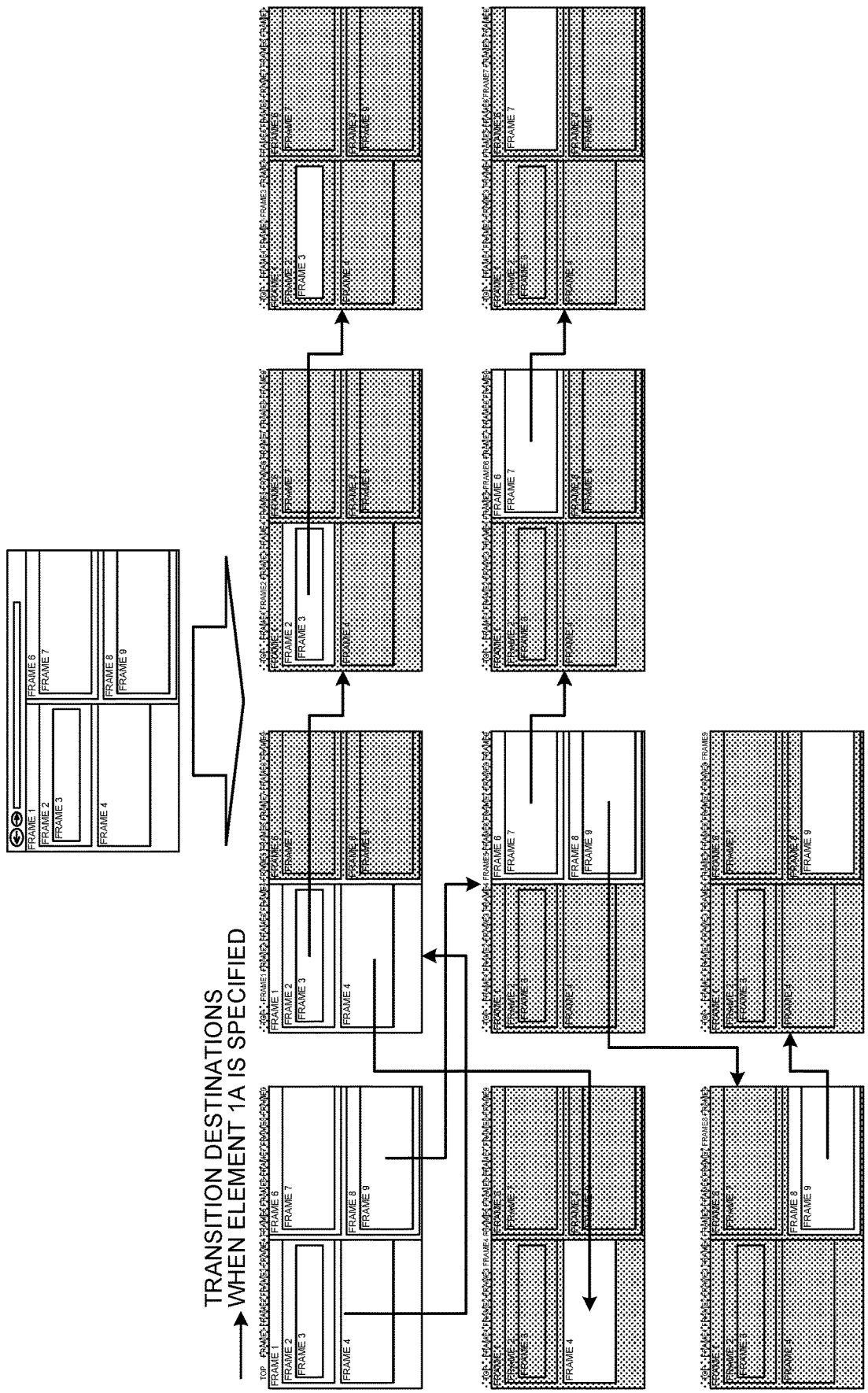
FIG. 9 is an explanatory diagram for describing processing of the editing unit.

Here, FIG. 9 illustrates the GUI including inline frames. In the example illustrated in FIG. 9, display is performed with a plurality of DOM element selection panels being used for each of the inline frames. In a hatched region of each panel, inline frames other than the inline frames displayed on the panel are displayed as a background image, and a DOM element selection cannot be performed. A plurality of panels may be displayed on an editing window in an overlapping format with a tab panel. When a user selects inside of a hatched inline frame, the inline frame configuration tree may be traversed to be switched to the tab panel.

Figure 10:
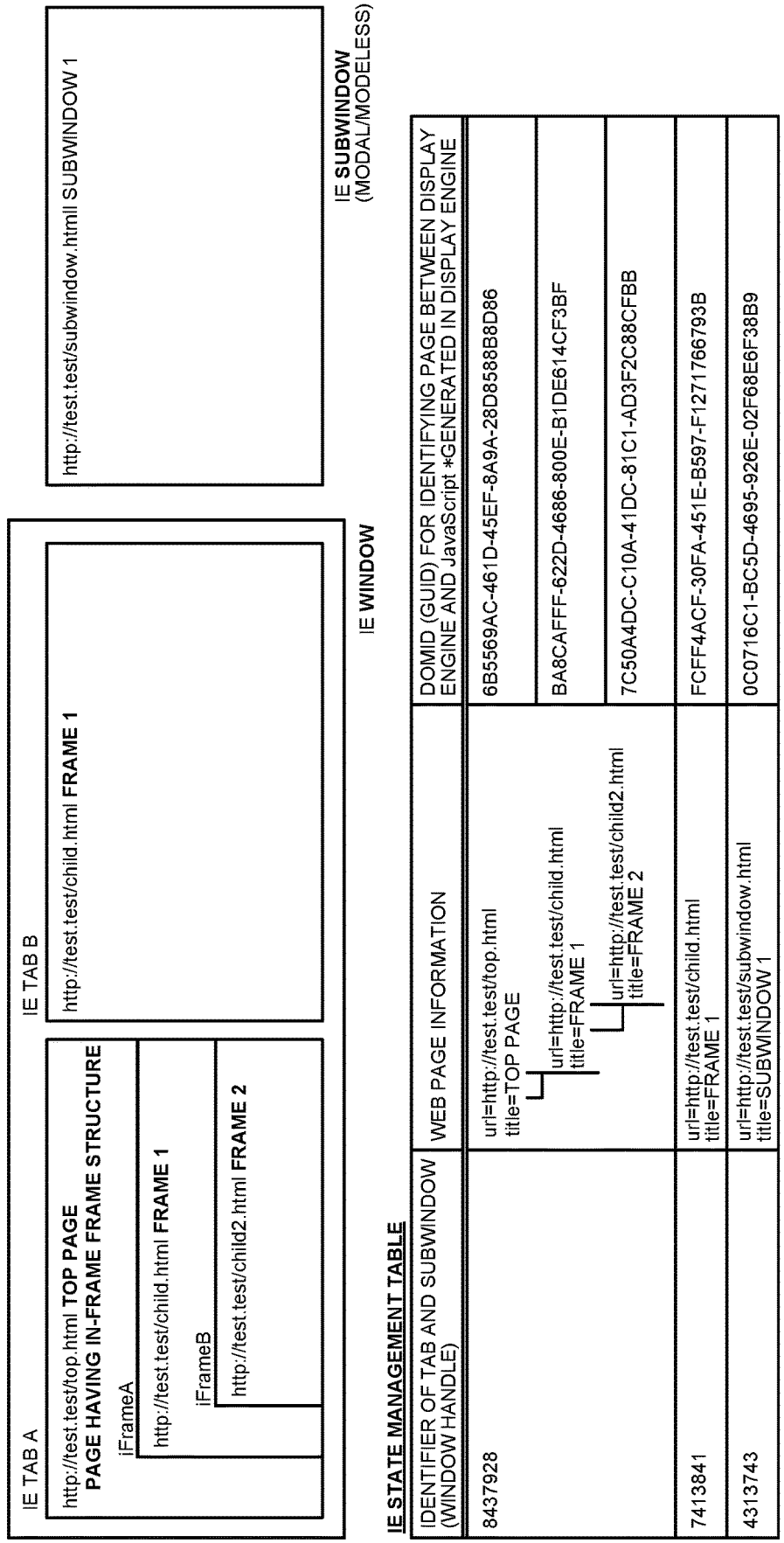
FIG. 10 is an explanatory diagram for describing processing of the editing unit.
Figure 12:
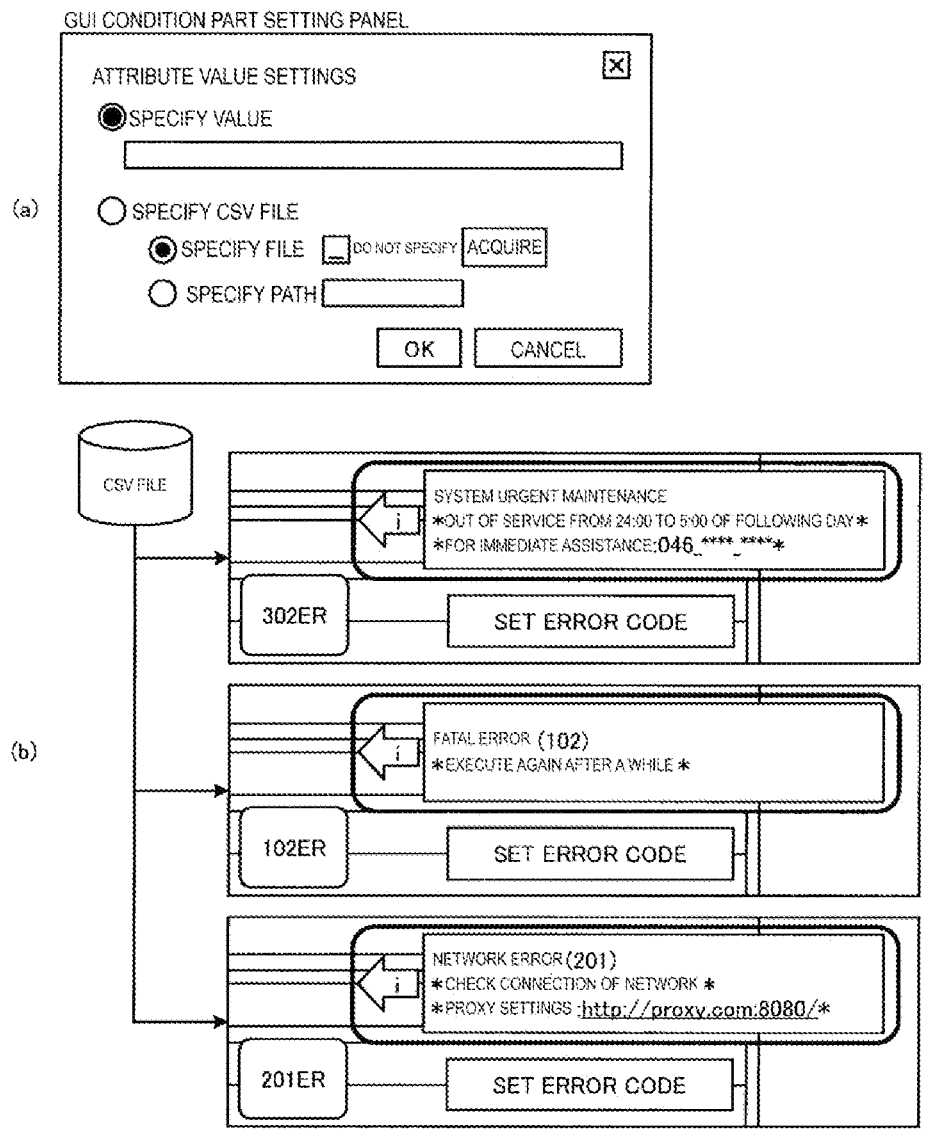
FIG. 12 is an explanatory diagram for describing processing of the editing unit.

In this case, for example, as illustrated in FIG. 10, frame 1 inside the tab A is identified as a web page having a URL of "http://test.test/child.html" different from a URL of a top page "http://test.test/top.html". Thus, when frame 1 is selected by a user, a tab B is displayed as an independent web page not dependent on the structure of a top page. The editing unit 15d can create the rule 14a not dependent on the structure of a top page by using an editing screen of the GUI as described above.

The editing unit 15d may use a UI in which a default value of a DOM element is displayed in the condition setting panel illustrated in FIG. 8 when the DOM element being a target of the rule 14a is selected. For example, the editing unit 15d uses a UI illustrated in FIG. 11(a) on each panel of the editing screen illustrated in FIG. 8. FIG. 11(a) illustrates a UI panel for setting the GUI condition part of the annotation rule.

When a user sets a state of a DOM element being a target of a rule, the editing unit 15d displays the UI panel illustrated in FIG. 11(a), and receives input of a user. Here, when the user selects a DOM element, as illustrated in FIG. 11(a), a default value of an attribute value of the DOM element is displayed.

A default value of valid/invalid is set for a predetermined attribute according to a DOM element tag, and input of an attribute of invalid is arranged not to be received. The user can easily set the GUI condition part of the annotation rule by directly using the displayed default value.

Note that, in FIG. 11(a), a dynamic attribute refers to an attribute value that varies depending on a user operation. A static attribute refers to an attribute other than the dynamic attribute. Setting of the default value of the UI panel as described above is implemented by using UI components in accordance with control illustrated in FIG. 11(b). In FIG. 11(b), valid UI components are represented by ○, and invalid UI components are represented by x.

The editing unit 15d may use a UI that can collectively set a plurality of conditions with different attribute values for one DOM element. For example, the editing unit 15d uses a UI illustrated in FIG. 12(a) on each panel of the editing screen illustrated in FIG. 8. The UI panel illustrated in FIG. 12(a) is, for example, displayed when a value having a "Text" attribute is specified and an "edit" button is selected in the UI panel illustrated in FIG. 11(a).

When a radio button "specify CSV file" is selected on the GUI panel of FIG. 12(a), as illustrated in FIG. 12(b), a plurality of combinations of attribute values and annotation messages can be collectively specified.

For example, FIG. 12(b) illustrates a case in which a plurality of annotation messages to be displayed are collectively specified for a plurality of error codes such as "302ER", "102ER", and "201ER". In this manner, for example, setting of the annotation rule for 100 error codes can be performed with high efficiency by using CSV data of 100 rows in one annotation rule instead of using definition of 100 annotation rules.

Display Control Processing

Figure 13:
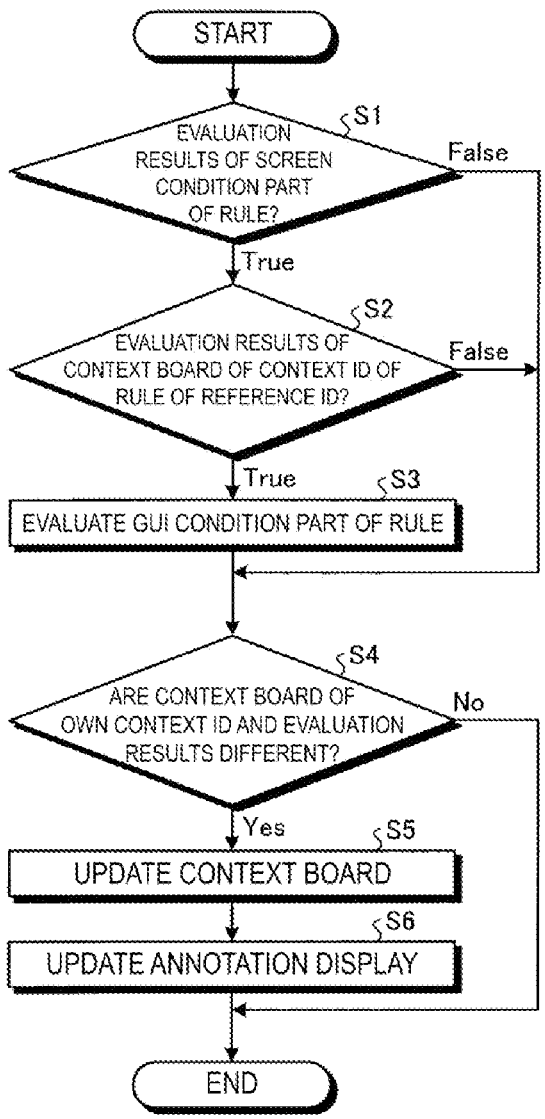
FIG. 13 is a flowchart illustrating a display control processing procedure.

Next, FIG. 13 is a flowchart illustrating a display control processing procedure. FIG. 13 illustrates a processing procedure of a case in which annotation is displayed based on the rule 14a. The flowchart of FIG. 13 is started at timing when there is a change in the context board 14b, for example.

First, the rule interpretation execution unit 15c performs evaluation as to whether the screen condition part of the annotation rule constituting the rule 14a matches a web page of the context board 14b of a target (Step S1). If the screen condition part does not match as a result of the evaluation (Step S1. False), the rule interpretation execution unit 15c causes the processing to proceed to Step S4.

In contrast, if the screen condition part matches as a result of the evaluation (Step S1, True), the rule interpretation execution unit 15c refers to a context ID of the annotation rule of a parent node identified with a reference ID of the annotation rule, and checks, in the context board 14b, evaluation results of the context ID of the parent node (Step S2). If the evaluation results of the context ID of the parent node show False, the rule interpretation execution unit 15c causes the processing to proceed to Step S4.

In contrast, if the evaluation results of the context ID of the parent node show True, the rule interpretation execution unit 15c performs evaluation of comparing the GUI condition part of the annotation rule and a DOM element of the context ID (Step S3).

In the processing of Step S4, the rule interpretation execution unit 15c checks whether or not the evaluation results of the state of DOM of the context ID are different from the evaluation results of the context board 14b. If the evaluation results are not different (Step S4, No), the rule interpretation execution unit 15c ends a series of display control processing. In contrast, if the evaluation results are different (Step S4, Yes), the rule interpretation execution unit 15c updates the context board 14b (Step S5).

The rule interpretation execution unit 15c executes the processing of Step S1 to Step S5 for other annotation rules of the rule 14a. Then, the rule interpretation execution unit 15c updates display of annotation specified in the rule 14a when all of the evaluation results for each annotation rule indicate "True" (Step S6). In this manner, a series of display control processing ends.

Figure 14:
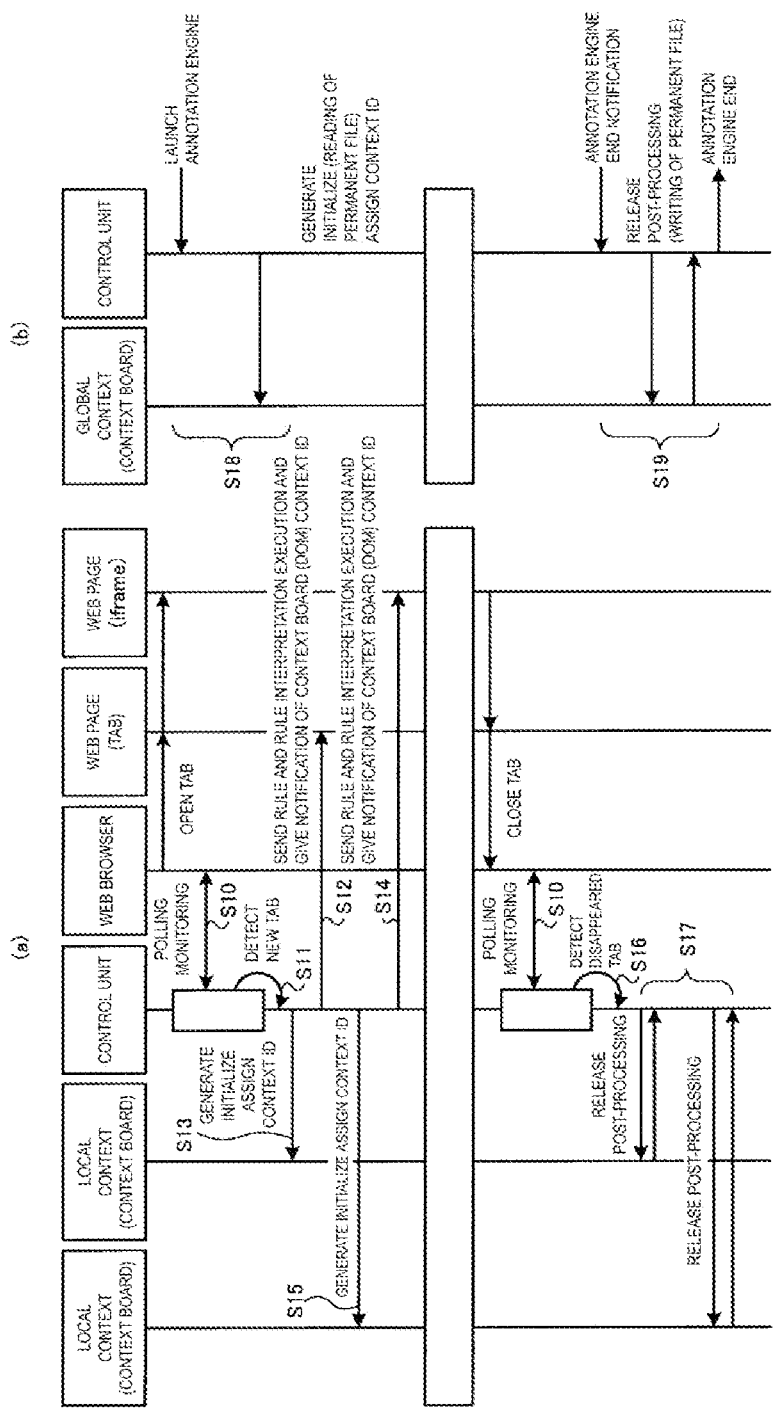
FIG. 14 is a sequence diagram illustrating the display control processing procedure.
Figure 15:
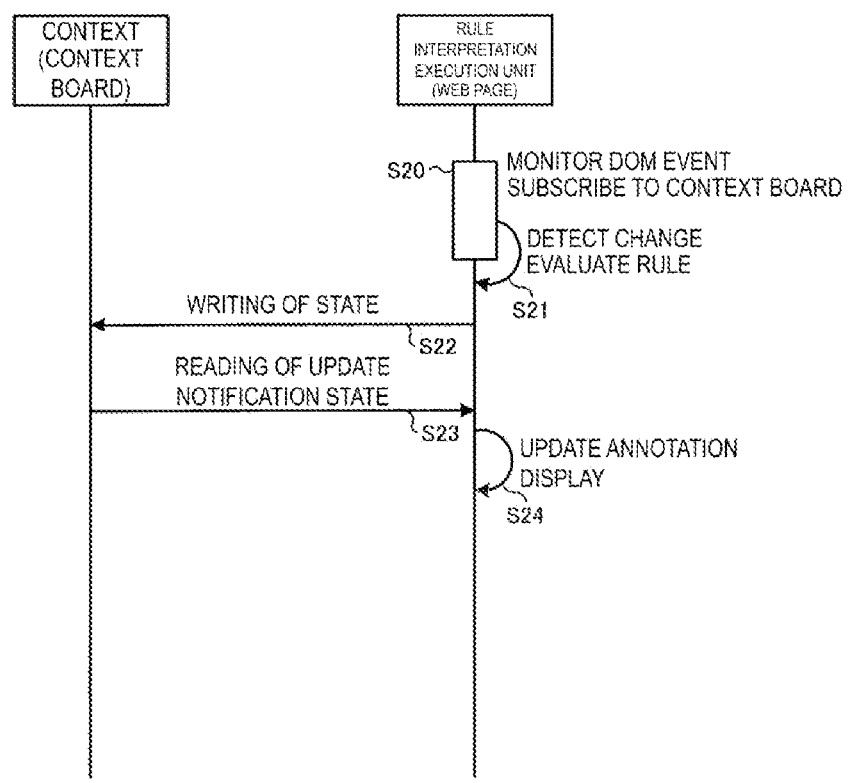
FIG. 15 is a sequence diagram illustrating the display control processing procedure.
Figure 16:
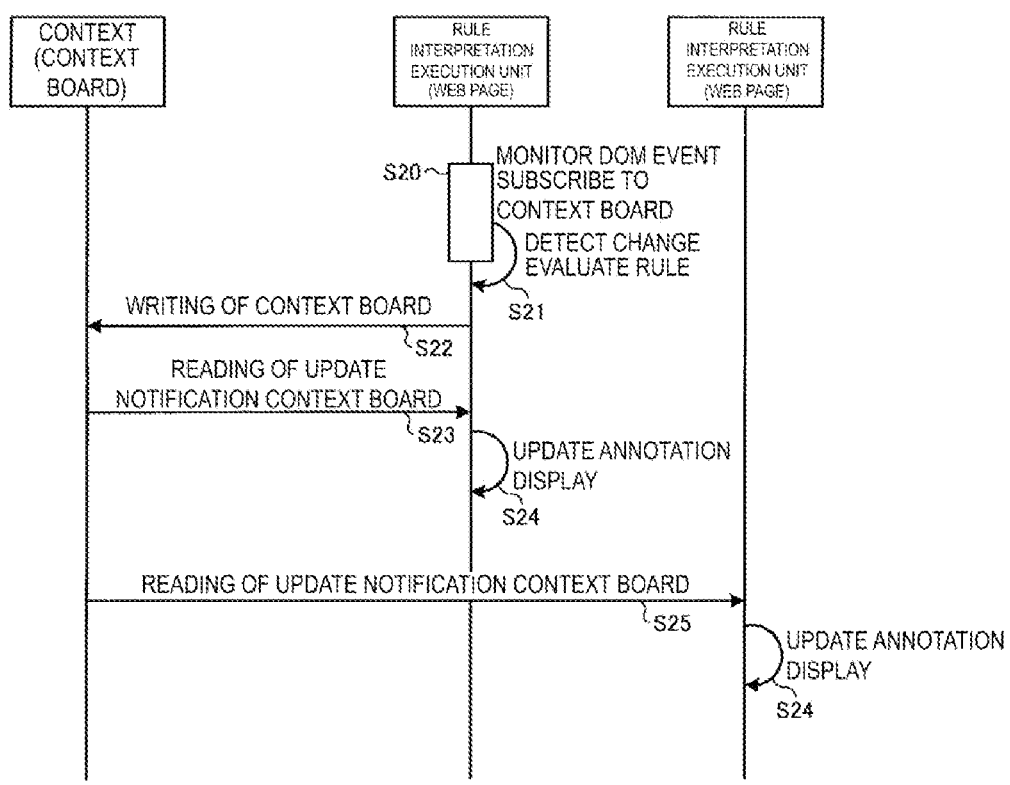
FIG. 16 is a sequence diagram illustrating the display control processing procedure.

FIG. 14 to FIG. 16 are each a sequence diagram illustrating a display control processing procedure. FIG. 14 to FIG. 16 illustrate a processing procedure related to monitoring of the context board 14b. First, in FIG. 14, a processing procedure of initialization and end of the context board 14b is illustrated. As illustrated in FIG. 14(a), the control unit 15 constantly performs polling monitoring with a web browser (Step S10).

Then, when the control unit 15 detects a new web page (Step S11), the rule 14a and the rule interpretation execution unit 15c of the web page are sent (Steps S12 and S14). The control unit 15 generates and initializes a corresponding context board 14b, and assigns a context ID (Steps S13 and S15). In this case, the control unit 15 associates the corresponding context board 14b and the corresponding rule interpretation execution unit 15c of the web page.

When the control unit 15 detects disappearance of a web page (Step S16), the control unit 15 performs and releases post-processing for a corresponding context board 14b (Step S17).

As illustrated in FIG. 14(b), the control unit 15 generates and initializes the context board classified in the global context illustrated in FIG. 7 at the time of launch, and assigns a context ID (Step S18). At the time of initialization, the control unit 15 reads a permanent file, if any.

The control unit 15 performs and releases post-processing for the context board along with ending (Step S19). At the time of post-processing, the control unit 15 performs writing of a history in a permanent file for the context board including a permanent file.

Next, in FIG. 15 and FIG. 16, a processing procedure related to update of the context board 14b is illustrated. First, as illustrated in FIG. 15, the rule interpretation execution unit 15c monitors events of changes of a DOM structure of a web page, subscribes to the context board 14b, and thereby monitors a state of the DOM element (Step S20). When the rule interpretation execution unit 15c detects a change of the state of the DOM element, the rule interpretation execution unit 15c performs evaluation of comparing the state of the DOM element and a state identified with the annotation rule (Step S21).

The rule interpretation execution unit 15c performs update of changing a set value of "True" or "False" being evaluation results of an object specified with the context ID of the context board 14b, if necessary (Step S22). When the rule interpretation execution unit 15c performs update of the context board, the rule interpretation execution unit 15c performs notification of update, and reads the latest state of the context board 14b (Step S23).

Then, when the rule interpretation execution unit 15c receives notification of update of the context board 14b, the rule interpretation execution unit 15c executes display control processing illustrated in FIG. 13, and updates annotation display (Step S24).

Note that, as indicated by the one-dot-one-dash line in FIG. 6, FIG. 16 illustrates a case in which the rule interpretation execution unit 15c refers to another context board 14b. The processing of FIG. 16 is different from the processing of FIG. 15 in that the processing of Step S25 is added. Except for those described above, the processing of FIG. 16 is the same as the processing of FIG. 15, and thus description thereof is omitted.

In the processing of Step S25, when update of the context board is performed, the rule interpretation execution unit 15c gives notification of update of the rule interpretation execution unit 15c of another web page. The "another web page" is a web page associated with another context board corresponding to an object of a context ID of a monitor target.

Similarly to the description above, the rule interpretation execution unit 15c of another web page that is notified of update reads the latest state of the context board 14b associated with the rule interpretation execution unit 15c, executes the display control processing illustrated in FIG. 13, and updates the annotation display (Step S24).

Note that it is only necessary that, when the rule interpretation execution unit 15c refers to the context board 14b by using a context ID, search be performed in predetermined priority with the associated context board 14b being the highest priority, and a context ID in the context board 14b being present be adopted. For example, first, search may be performed from the global context having early generation order. Next, search may be performed from the local context having new generation time.

As has been described in the above, in the display control apparatus 10 according to the present embodiment, the storage unit 14 stores the rule 14a for specifying additional information to be displayed for each operation scene identified with a combination of the states of DOM elements of a predetermined web page represented by presence/absence or attribute values. As a monitor unit, the rule interpretation execution unit 15c monitors a state of a DOM element of a web page, and causes the storage unit 14 to store the state as the context board 14b. As a display control unit, the rule interpretation execution unit 15c displays, if the states of the operation scene match the states of the context board 14b stored in the storage unit 14, additional information specified with the rule 14a.

In this manner, in the display control apparatus 10, annotation is dynamically updated and appropriately displayed even without reloading of a web page, according to a change of a DOM element being a target of application of annotation. A complex composite condition covering a practical operation scene can be defined with a high degree of freedom. For example, a complex composite condition can be defined by combining scheduling, an operation menu, a screen state, non-display specification, and so on. Even when there are a plurality of windows, tab panels (web contents), or inline frames in particular, a composite condition across screens can be defined with a high degree of freedom.

In this manner, in the display control apparatus 10, a detailed operation scene can be identified by combining a simple relationship of annotation rules for identifying states of DOM elements. Here, for example, the simple relationship includes a relationship consisting of a logic expression (AND/OR) and a constraint condition (N-set constraint), a relationship consisting of a set of states across a plurality of screens, a relationship consisting of a set of states at a distant time point in time series, and a relationship including states acquired from the outside of a web page.

In the display control apparatus 10, hook settings of events, handler calling, and the like are implemented as common functions as a standard, and thus missing or delay of update of annotation display or the like does not occur. For example, exceptional processing dependent on a frame configuration of a target web screen and reading timing is automatically performed irrespective of user operation. A state outside a web page such as an external system can be added with a sub-class classification of the context board, and thus missing or delay of update of annotation display or the like does not occur. For example, processing of reevaluating the rule 14a with reference to the context board under influence of state update is automatically performed irrespective of user operation.

In this manner, the display control apparatus 10 can easily perform definition of an operation scene for performing annotation display, and can update annotation display appropriately according to a change of the operation scene.

A user performs creation or editing of the rule 14a by using the GUI in which an operation scene is visualized with the editing unit 15d. For example, the editing unit 15d presents a GUI for performing editing of an attribute value that can be used in selector specification, and thus a user can easily perform settings of the rule 14a.

In particular, the editing unit 15d initializes an editing GUI with a default value according to a DOM element tag selected by a user, and thus a user can easily set the rule 14a. For example, when a user selects a search form element, a tag is changed to "INPUT", and a value attribute is changed to "×××", for example. Thus, a user can set the rule 14a by directly using the default value. In this manner, even a general user not having programming skills can easily define a practical operation scene and specify annotation display.

Example

Figure 17:
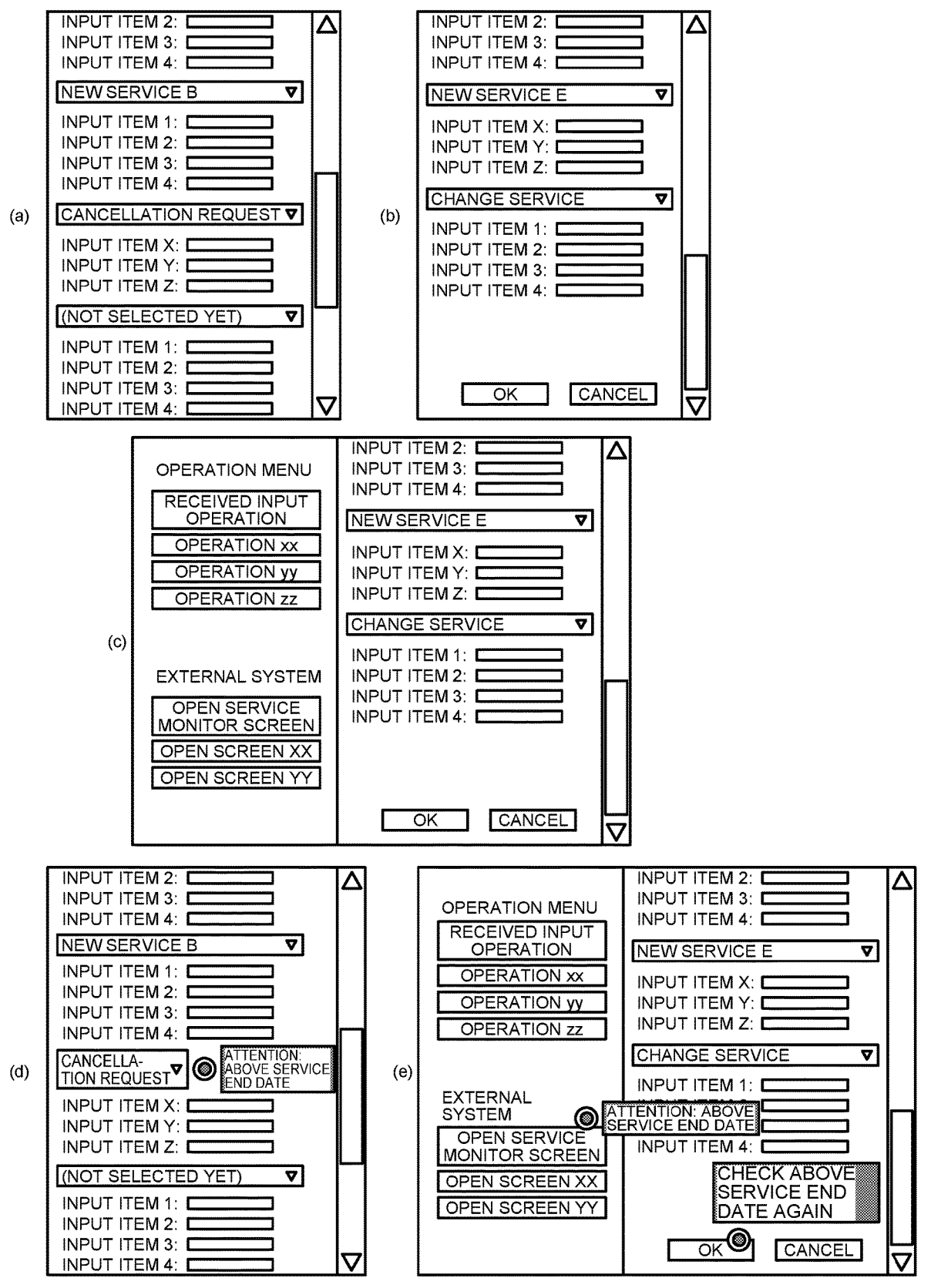

Next, FIG. 17 to FIG. 26 are each an explanatory diagram for describing an example of display control processing performed by the display control apparatus 10. First, FIG. 17 illustrates a case in which annotation is displayed when a predetermined label such as "cancellation request" is present in a table element on a panel of a web page as a certain operation screen. FIG. 17 illustrates an operation screen of a case in which a certain operation item consists of one or more sub-items. In FIG. 17(a), three sub-items are displayed in a region seen by a user owing to a scroll function in a screen window.

An operator checks display of each of the sub-items and inputs data as necessary, using the operation screen. Then, with a press on the "OK" button, which indicates making a commitment, in the lowest part of scroll illustrated in FIG. 17(b), operation for one operation item completes. For example, input of a sub-item that requires a careful input such as "cancellation request" out of a plurality of types of sub-items, another system in some cases needs to refer to operation information from another perspective in order to confirm whether the input data is correct. In view of this, as illustrated in FIG. 17(c), the "open service monitor screen" button, which allows for reference of another system, is provided on the left panel.

Here, if an operator has a low level of proficiency and makes a commitment without a sufficient confirmation of input data even when "cancellation request" is included in a sub-item, there is a risk that a large loss in operation is caused. In view of this, as illustrated in FIG. 17(d), the display control apparatus 10 can forcibly display annotation according to a selection state of a combo box near an input field (combo box) of the sub-item "cancellation request".

There is a risk that even a proficient operator may forget in the course of operation of a large number of sub-items with a long scroll. In view of this, as illustrated in FIG. 17(e), the display control apparatus 10 can collectively attract attention when there is one or more parts with a selection state of a combo box being "cancellation request" on an operation screen. In FIG. 17(e), annotation "check above service end date again" is displayed near the "OK" button when making a commitment. Simultaneously, annotation "attention: above service end date" indicating relevant details is displayed near the "external system" button at a distant position.

In this manner, the display control apparatus 10 can forcibly display annotation presupposing a use method. A condition of behavior of display of annotation by the display control apparatus 10 is not local or individual. Specifically, the display control apparatus 10 can display annotations at a plurality or positions or distant positions on a screen on a large scale and in a composite manner, according to a plurality of positions on a screen or states of distant positions with scroll. In other words, the display control apparatus 10 can freely define display rules of annotations according to individual problems or the like concerning configurations of an operation screen or operations, and can control behavior of annotation display in an advanced degree.

According to the display control apparatus 10, annotation is instantaneously and immediately displayed when an operator selects "cancellation request" in a combo box of an initial screen in which nothing is selected. Subsequently, annotation disappears instantaneously and immediately when selection is changed to another selection such as "new service A".

Annotation in the lowest part of scroll in the operation screen disappears only when all the "cancellation requests" on the operation screen are no longer present. The "open external system" button also disappears in conjunction with presence/absence of "cancellation request". In this manner, in the display control apparatus 10, at the time point when an operator performs selection operation, annotation display is dynamically controlled according to a state of a target system screen.

In addition, in an operation scene in which an operator searching for details of requests input in the past from order records and browsing then in the operation screen, it is assumed that "cancellation request" is included from the start. Thus, in this operation scene, the display control apparatus 10 can display necessary annotation without fail from the start without waiting for a combo box operation of an operator.

In this manner, in the display control apparatus 10, definition of the rule 14a can be freely described according to an attribute value of a DOM element, and can be edited using the GUI. In this manner, various and wide-range triggers can be taken into consideration without fail, instead of using a specific operation as a trigger. In this manner, according to the display control apparatus 10, also in a real time region, update of annotation display can be dynamically controlled according to a state of a target screen, and annotation can be forcibly displayed without attention of an operator.

Figure 18:
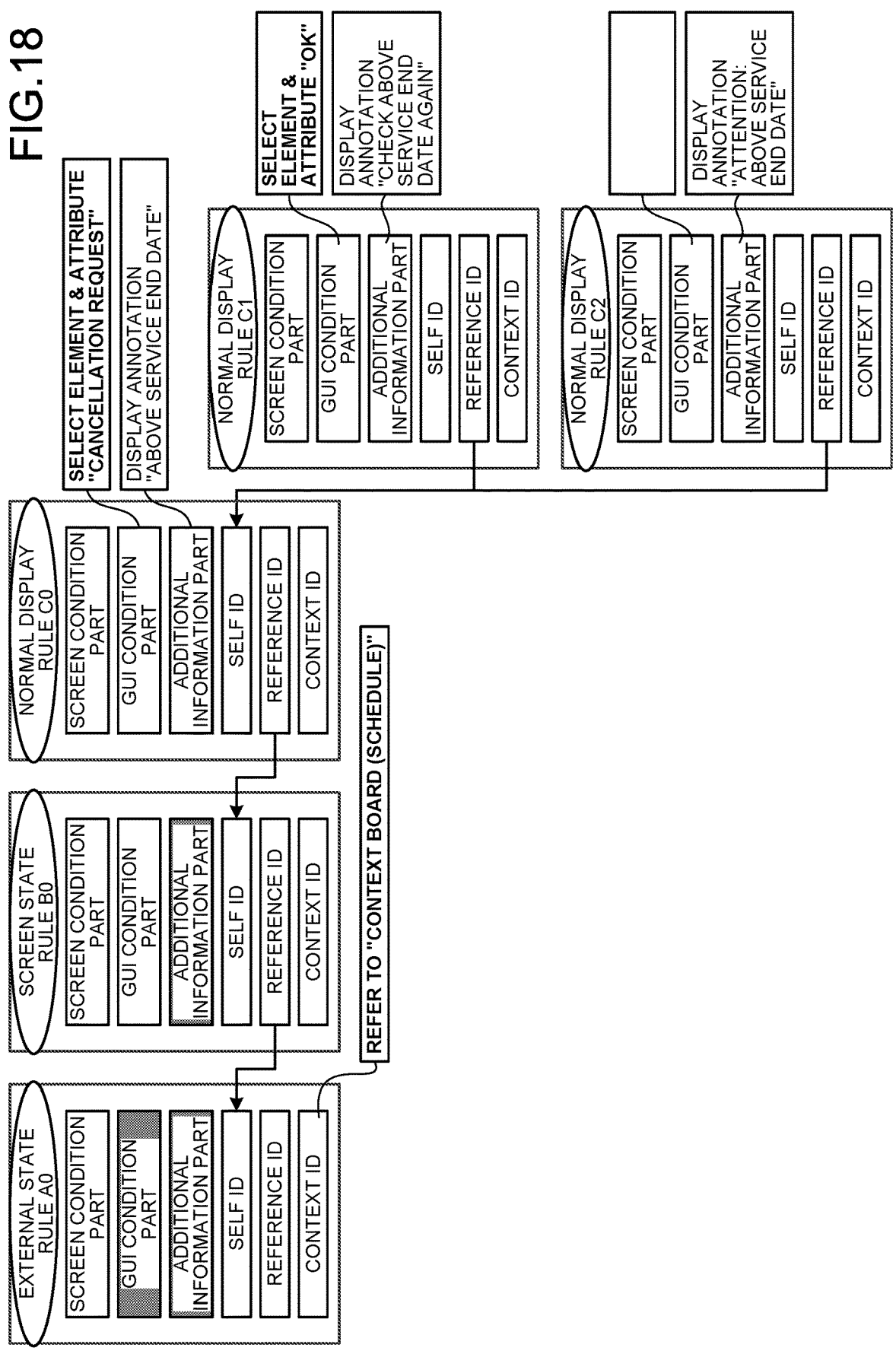
FIG. 18 is an explanatory diagram for describing the example of display control processing performed by the display control apparatus.

FIG. 18 illustrates a definition example of the rule 14a in the case illustrated in FIG. 17. As illustrated in FIG. 18, in a normal display rule C0 being a child node of a screen state rule B0, "select element & attribute" cancellation request"" is set in the GUI condition part, and "display annotation "attention: above service end date"" is set in the additional information part.

In the normal display rule C0, two child nodes of a normal display rule C1 and a normal display rule C2 are set, which branch into two conditions. In the normal display rule C1, "button element & attribute "OK"" is set in the in the GUI condition part, and "display annotation "check above service end date again"" is set in the additional information part. In the normal display rule C2, "button element & attribute "open service monitor screen"" is set in the GUI condition part, and "display annotation "attention: above service end date"" is set in the additional information part.

In the rule 14a illustrated in FIG. 18, an external state rule A0 is added. In the external state rule A0, a context ID for reference of the context board (schedule) is set. In this manner, in the display control apparatus 10, for example, annotation display can be arranged to be displayed during "1st July to 31st July", and can be arranged not to be displayed in other periods. Specifically, by assigning an object group described above under a subtree of the context board (schedule) for monitoring calendar information of a PC as an external state, the above is implemented in the display control apparatus 10.

Similarly, in the display control apparatus 10, more complex display control can be defined by combining rule addition. For example, when the above display control in intended to be further switched on and off through selection of a user, a menu "display annotation for novice user" may be arranged in the example of FIG. 21 to be described later, and an annotation rule that refers to "context board (operation context switching)" may be added. In the display control apparatus 10, as described above, complex control as a whole can be configured by combining various type of control.

Figure 19:
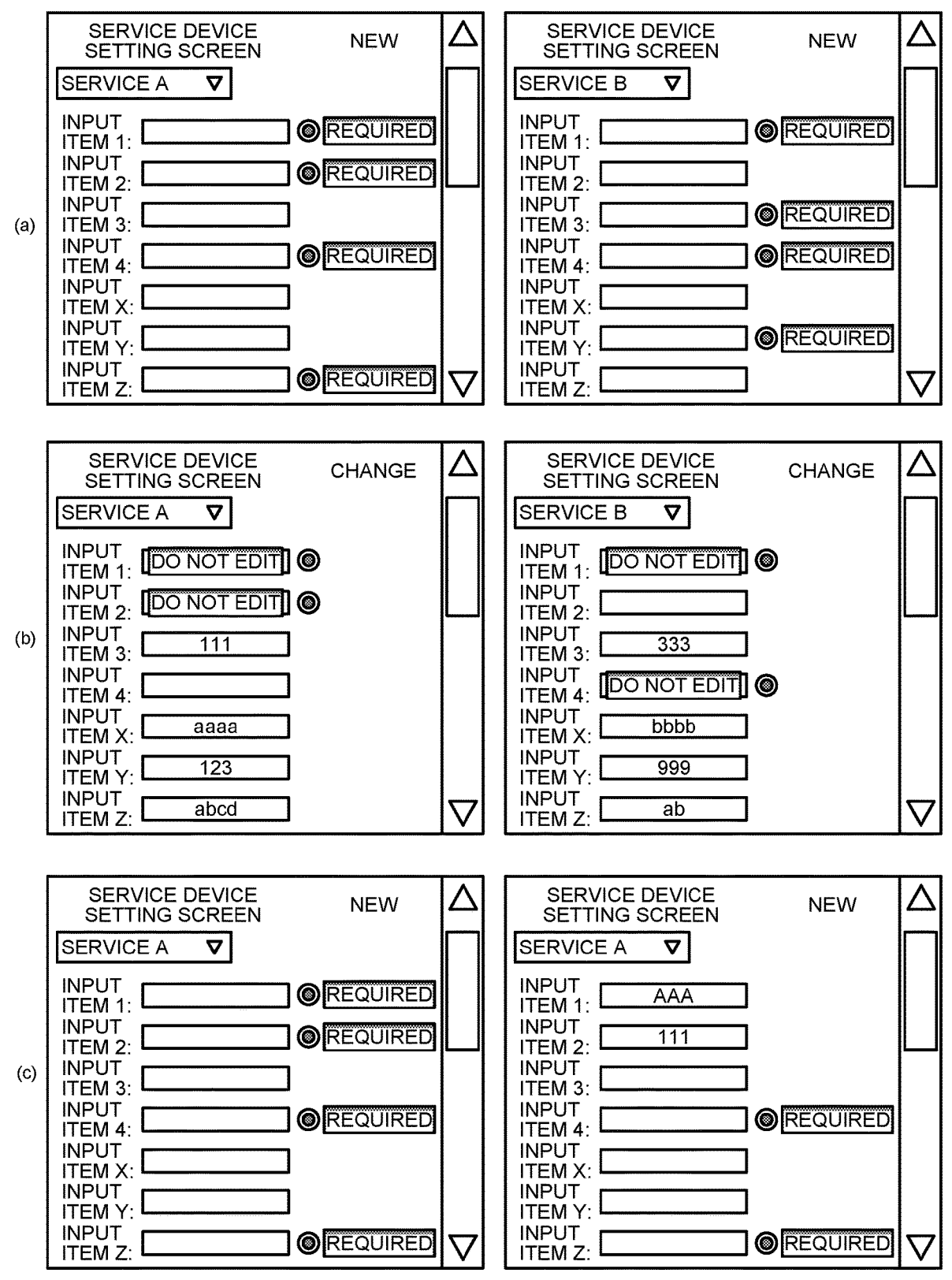

FIG. 19 illustrates a case of displaying annotation messages indicating required data when input for a text field being a required item has not yet been input. FIG. 19 illustrates a case in which two types or more of operation items are configured with a large number of input items, and a combo box is used to specify processing for which operation of which type. In the operation system, all the input items are constantly editable for the sake of development. In contrast, item that require input or items that cannot be edited are specified in detail in operation, according to a type of operation item. Essentially, an operator needs to perform operation with full understanding of such specification.

Normally, when an operation item is issued, all input items are blanks. To input data appropriately and efficiently, an operator desires to know items that require input promptly and accurately. The display control apparatus 10 automatically switches annotation according to a state of a GUI element, and thus annotation display "required" can be switched in real time at the time point when a combo box is changed.

For example, in the example illustrated in FIG. 19(a), a set of required items for "service A" and a set of required items for "service B" are different. According to the display control apparatus 10, at the time point when "service A" or "service B" is selected, or at the time point when a selection is changed, a pattern of a set of required items is automatically switched. Note that the pattern of the set is not limited to two, and can be applied for three or more. For example, according to the display control apparatus 10, the pattern of the set of required items can be switched for three or more services in a similar manner.

FIG. 19(b) illustrates a case in which items not to be changed without caution are forcibly covered with annotation "do not edit" when an operator is to change data input in the past. In this case, specification with the rule 14a is possible so that an operator cannot perform operation of display/non-display of annotation. An input field present behind annotation does not accept a click event of a mouse and is prevented from being editable.

In this manner, according to the display control apparatus 10, arrangement is possible so that values are invisible to an operator and also values are not changeable by an operator. Even when an operator is not aware of risks of operation, such risks can be avoided by forcible display of annotation.

As illustrated in FIG. 19(c), the display control apparatus 10 can provide interactivity with a user. FIG. 19(c) illustrates a case in which annotation display of an item filled with an input disappears. In FIG. 19(c), input item 1 and input item 2 are already filled with input, and thus there is no longer annotation "required". This can prevent distraction of attention to items that have not been filled with input and thus require attention of an operator. In the display control apparatus 10, a case in which a value attribute value of a DOM element is empty or " " is specified with the rule 14a, and is thereby implemented.

Figure 20:
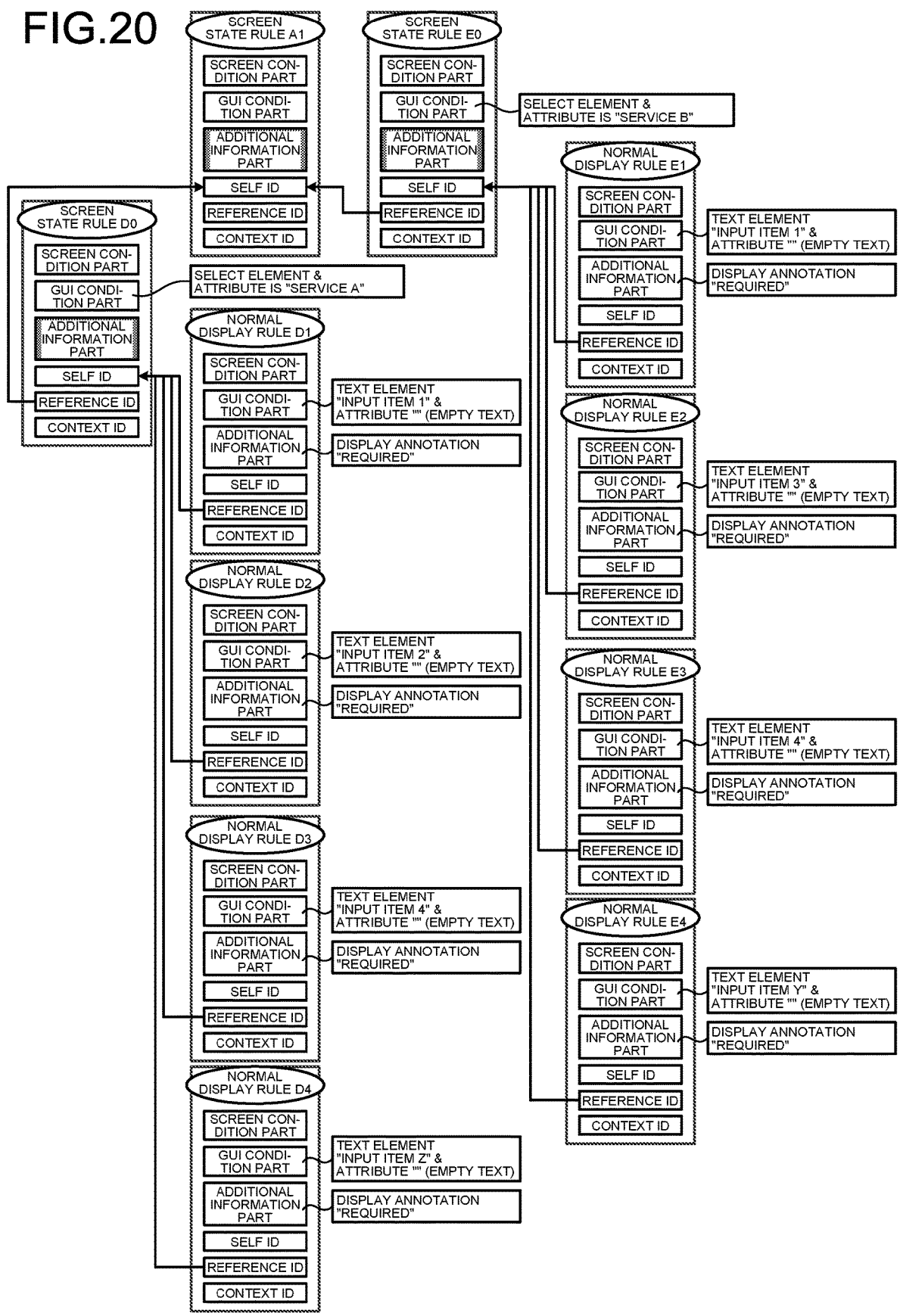
FIG. 20 is an explanatory diagram for describing the example of display control processing performed by the display control apparatus.

FIG. 20 illustrates a definition example of the rule 14a in the case illustrated in FIG. 19.

As illustrated in FIG. 20, in a screen state rule A1, two child nodes of a screen state rule D0 and a screen state rule E0 are set, which branch into two conditions. In the screen state rule D0. "select element & attribute "service A"" is set in the GUI condition part. Further, in the screen state rule E0, "select element & attribute "service B"" is set in the GUI condition part.

In the screen state rule D0, four child nodes of a normal display rule D1, a normal display rule D2, a normal display rule D3, and a normal display rule D4 are set, which branch into four conditions. In the normal display rule D1, "text element "input item 1" & attribute " " (empty text)" is set in the GUI condition part, and "display annotation "required"" is set in the additional information part.

In the normal display rule D2, "text element "input item 2" & attribute " " (empty text)" is set in the GUI condition part, and "display annotation "required"" is set in the additional information part. In the normal display rule D3, "text element "input item 4" & attribute (empty text)" is set in the GUI condition part, and "display annotation "required"" is set in the additional information part. In the normal display rule D4, "text element "input item Z" & attribute " " (empty text)" is set in the GUI condition part, and "display annotation "required"" is set in the additional information part.

In the screen state rule E0, four child nodes of a normal display rule E1, a normal display rule E2, a normal display rule E3, and a normal display rule E4 are set, which branch into four conditions. In the normal display rule E1, "text element "input item 1" & attribute " " (empty text)" is set in the GUI condition part, and "display annotation "required"" is set in the additional information part.

In the normal display rule E2, "text element "input item 3" & attribute " " (empty text)" is set in the GUI condition part, and "display annotation "required"" is set in the additional information part. In the normal display rule E3, "text element "input item 4" & attribute"" (empty text)" is set in the GUI condition part, and "display annotation "required"" is set in the additional information part. In the normal display rule E4, "text element "input item Y" & attribute " " (empty text)" is set in the GUI condition part, and "display annotation "required"" is set in the additional information part.

Figure 21A:
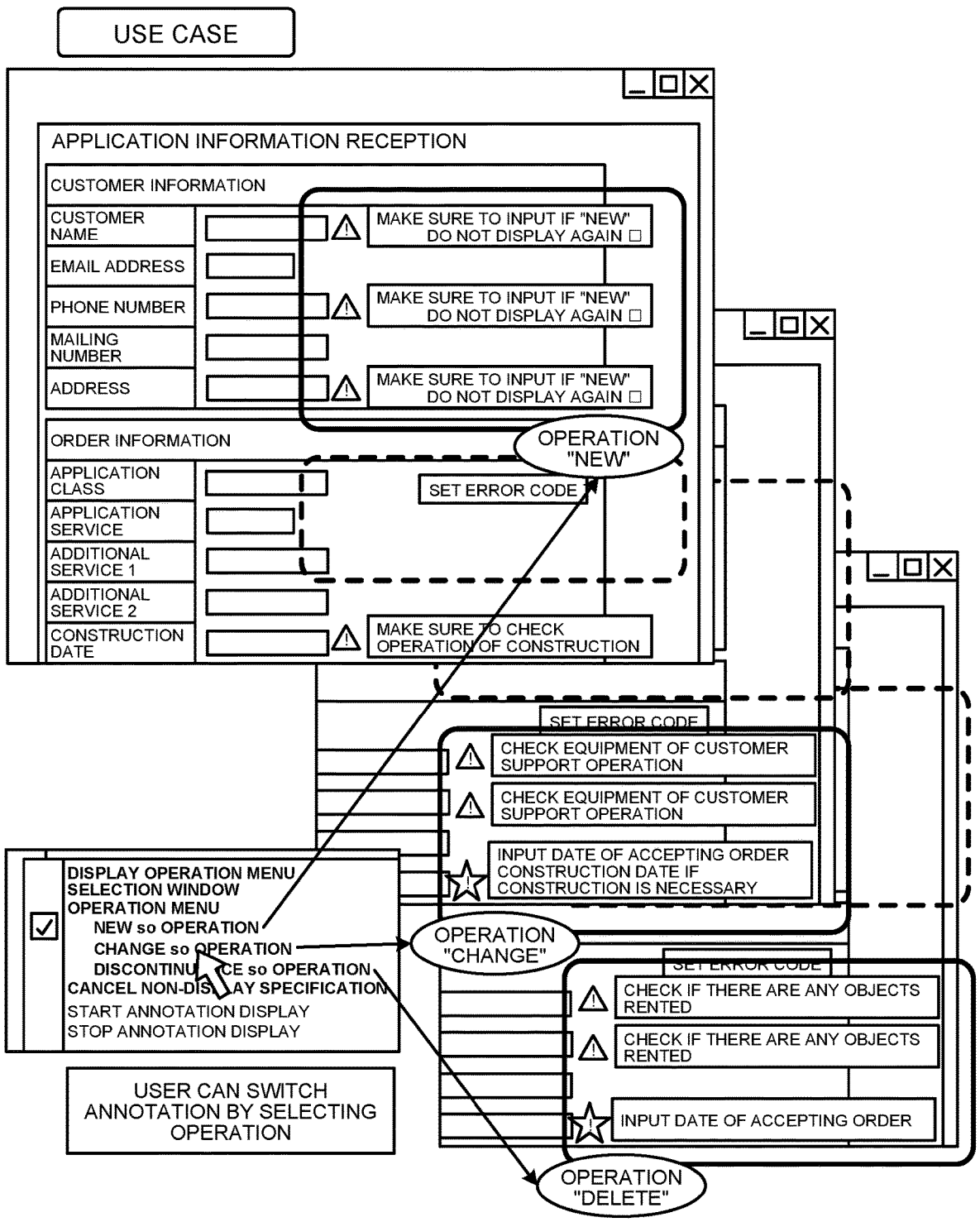
FIG. 21 is an explanatory diagram for describing the example of display control processing performed by the display control apparatus.

FIG. 21 illustrates a case of having a user select operation explicitly to switch annotations. For example, as illustrated in FIG. 21(a), when a user performs input of selection out of operations such as "new", "change", and "delete", the display control apparatus 10 displays annotation according to each of the operations.

Figure 21B:
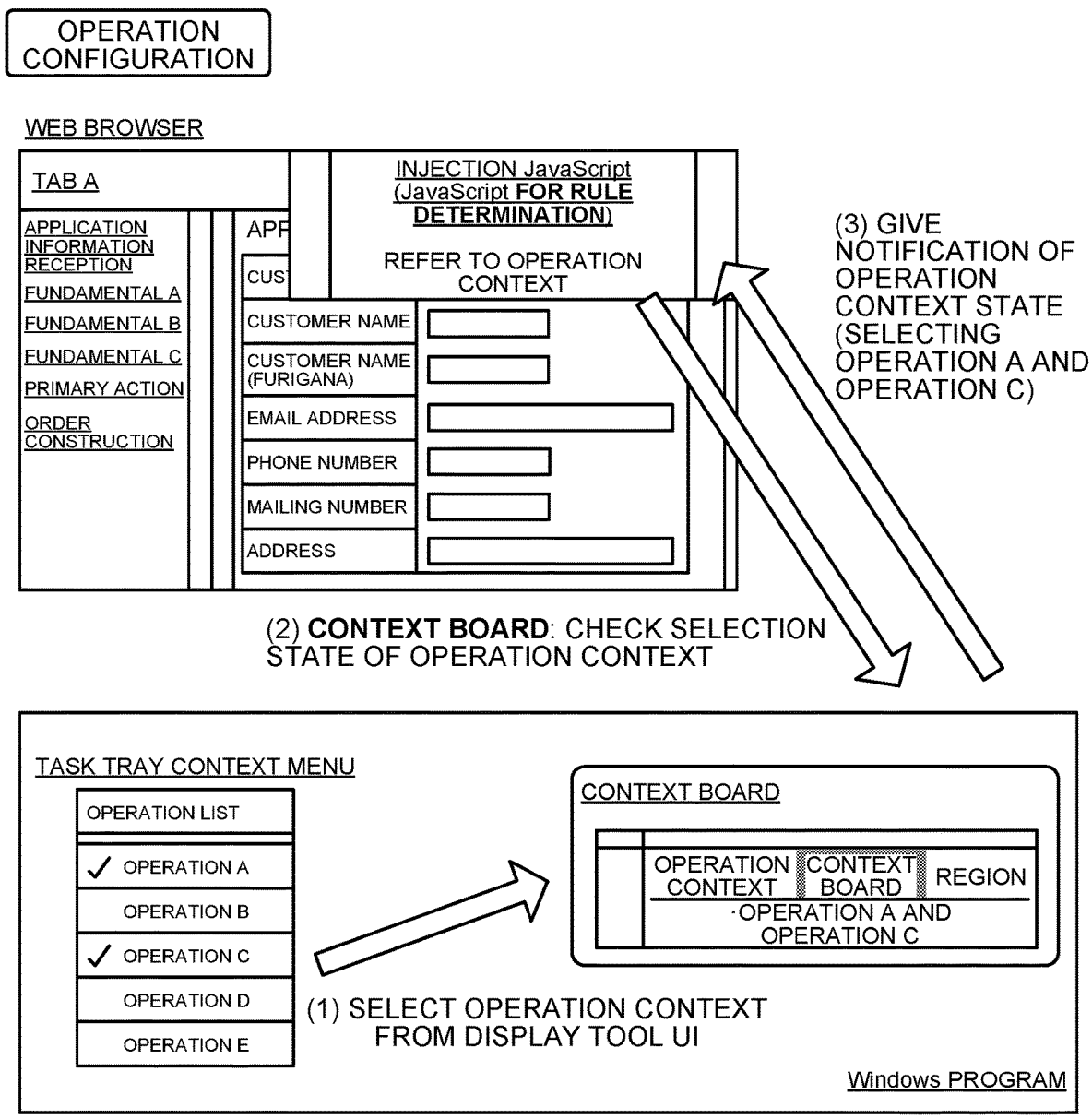

In this case, as illustrated in FIG. 21(b), the control unit 15 receives selection of operation by a user by using the GUI, and creates the rule 14a including a state of the selection of the operation of the user in an operation scene. The rule interpretation execution unit 15c generates an object representing a state of selection of operation by a user for the context board (operation context switching), and set evaluation results for the annotation rule specified with predetermined operation being a condition. In this manner, the display control apparatus 10 can have a user select operation explicitly and switch annotations.

Figure 22A:
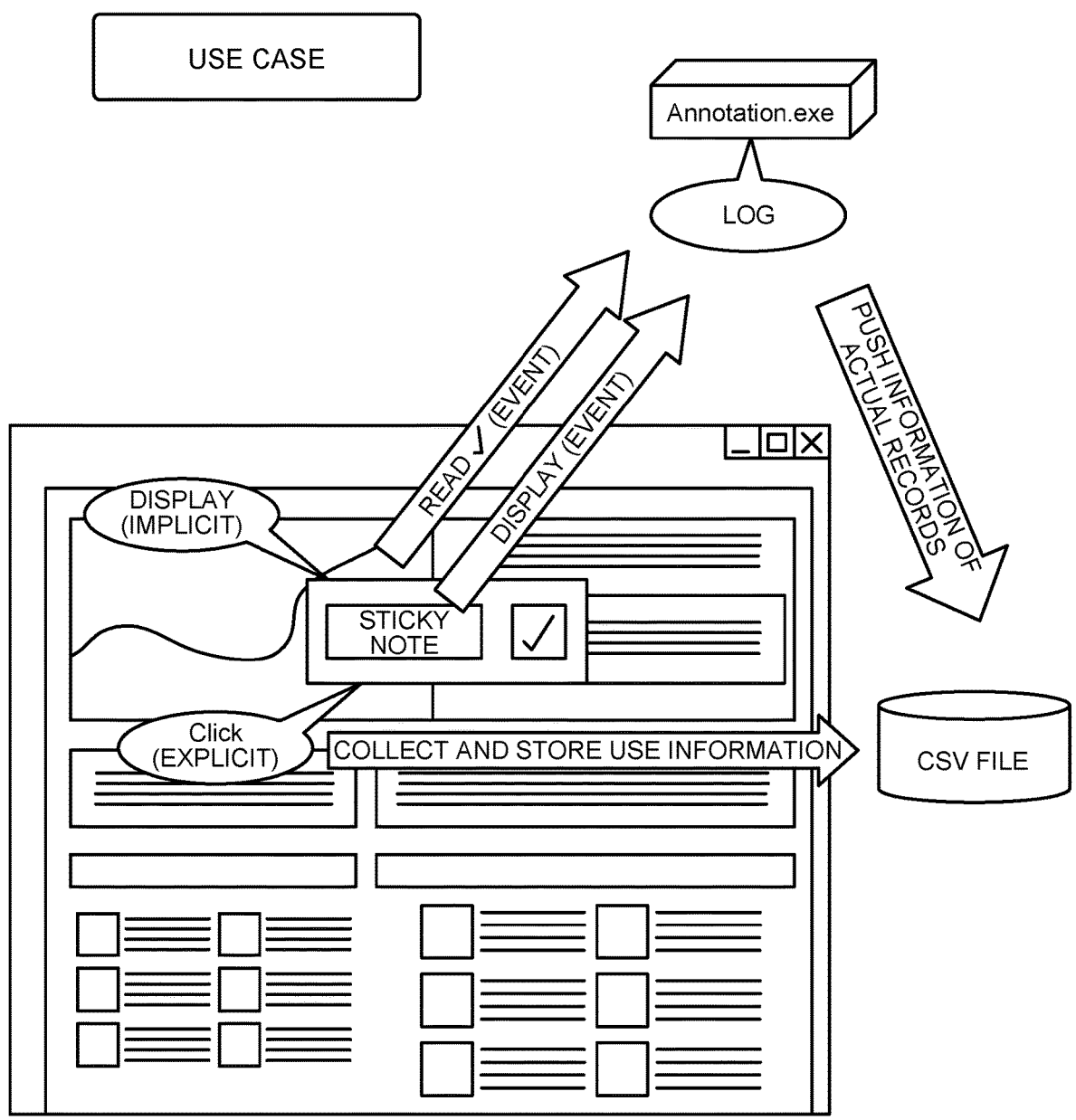
FIG. 22 is an explanatory diagram for describing the example of display control processing performed by the display control apparatus.
Figure 22B:
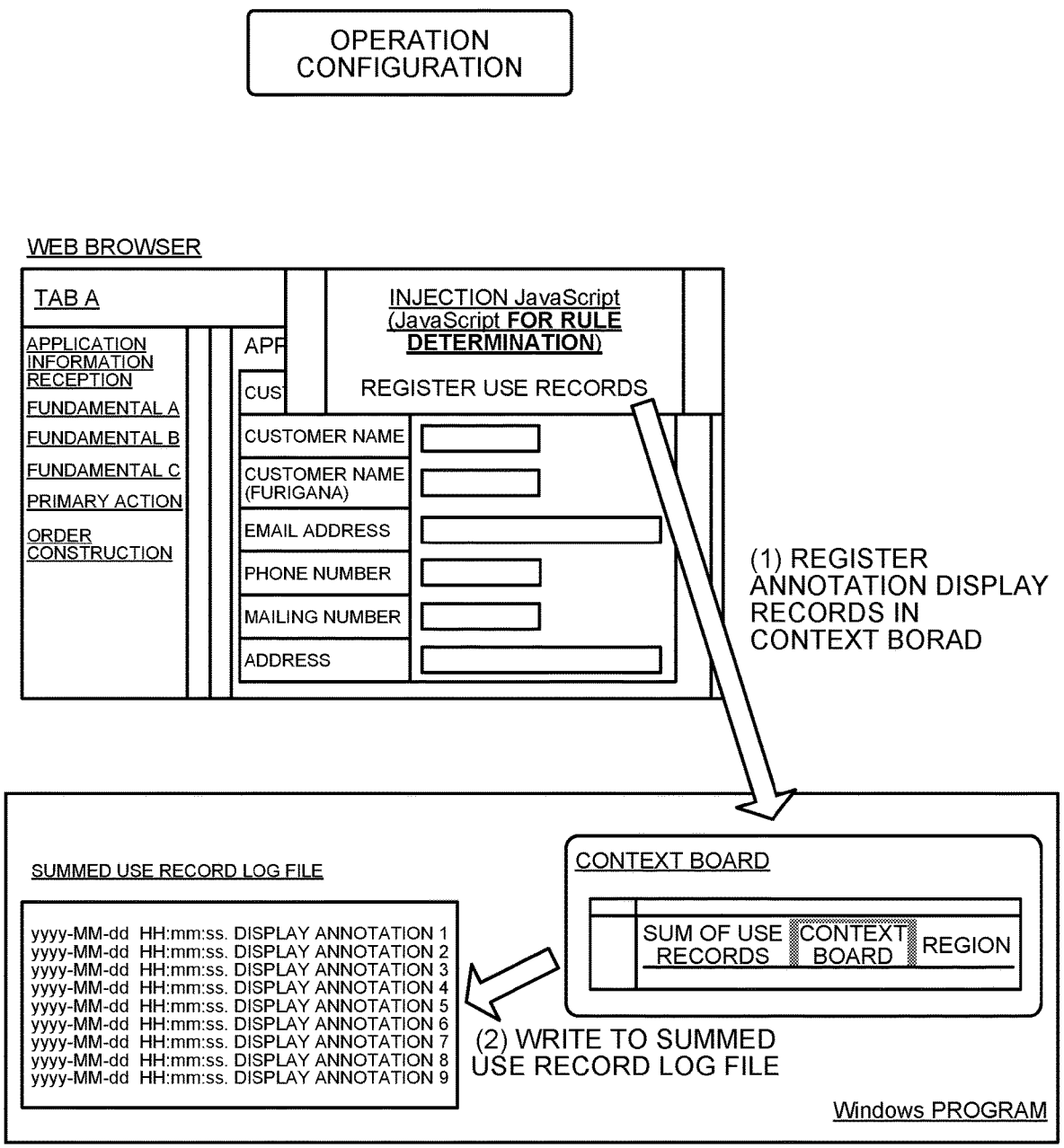

FIG. 22 illustrates a case of summing actual records of display of annotation. As illustrated in FIG. 22(b), when the display control apparatus 10 detects a display state of an icon or a sticky note, the rule interpretation execution unit 15c generates an object representing a display state of the icon or the sticky note for the context board (sum of use records), and sets display/non-display. For example, the display control apparatus 10 detects and sums display states explicitly through browsing operation such as a read function. "sticky note is pinned down", and "sticky note is opened", or implicitly through display of a sticky note.

In this case, as illustrated in FIG. 22(a), the control unit 15 uses the context board (sum of use records) to output time, details of a sticky note, or the like into a CSV file, for example. Information of the summed use records can be used by a manager for quantification of effects of annotation contents, or quantification for measures for improvement of an operation flow and process of surveys for a screen layout change or the like, for example.

Figure 23A:
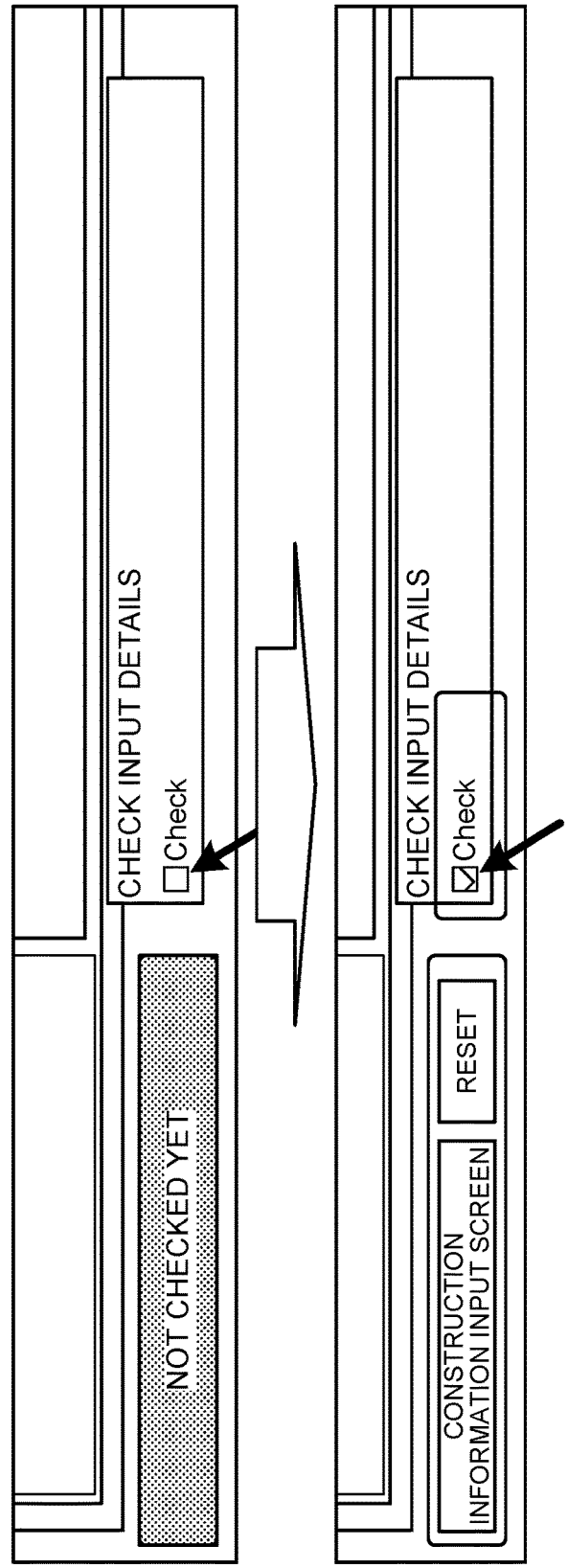
FIG. 23 is an explanatory diagram for describing the example of display control processing performed by the display control apparatus.

FIG. 23 illustrates a case of switching annotation according to a state of a distant time point in time series. For example, as illustrated in FIG. 23(a), the display control apparatus 10 hides a confirm button with an annotation with a check box, and enables a press of the confirm button after the user inputs a check.

Figure 23B:
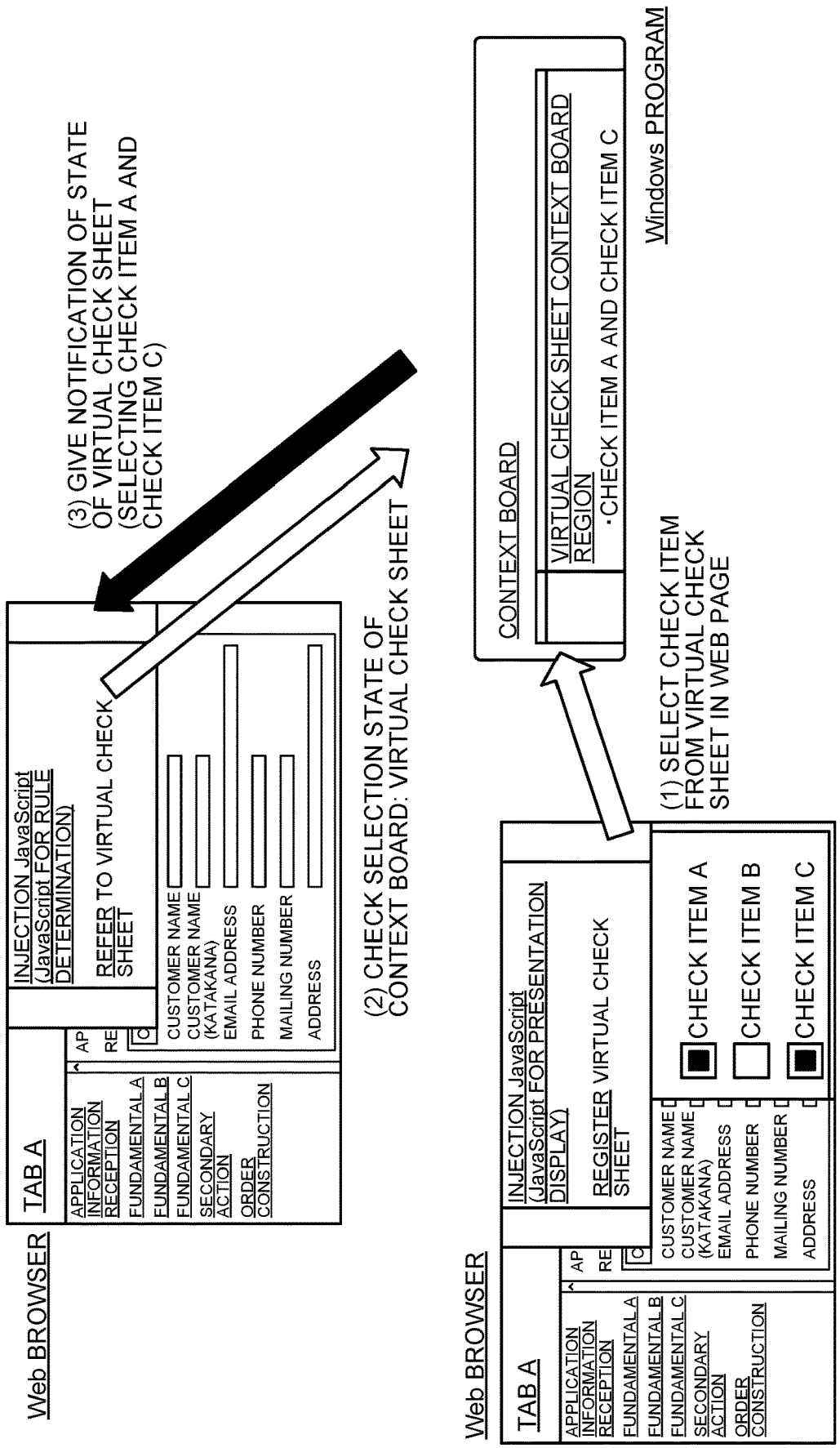

In this case, as illustrated in FIG. 23(b), the control unit 15 uses the annotation with a check box as a virtual check sheet, and receives input of the user indicating that a state at a distant time point in time series has been confirmed, such as input of a plurality of items. The control unit 15 creates the rule 14a including a check state of the check item of the virtual check sheet in an operation scene.

Then, the rule interpretation execution unit 15c generates an object representing a check state of the check item of the virtual check sheet for the context board (virtual check), and sets evaluation results for the annotation rule specified with a predetermined check state of the virtual check sheet being a condition. In this manner, the display control apparatus 10 can switch annotations according to a state at a distant time point in time series.

Figure 24A:
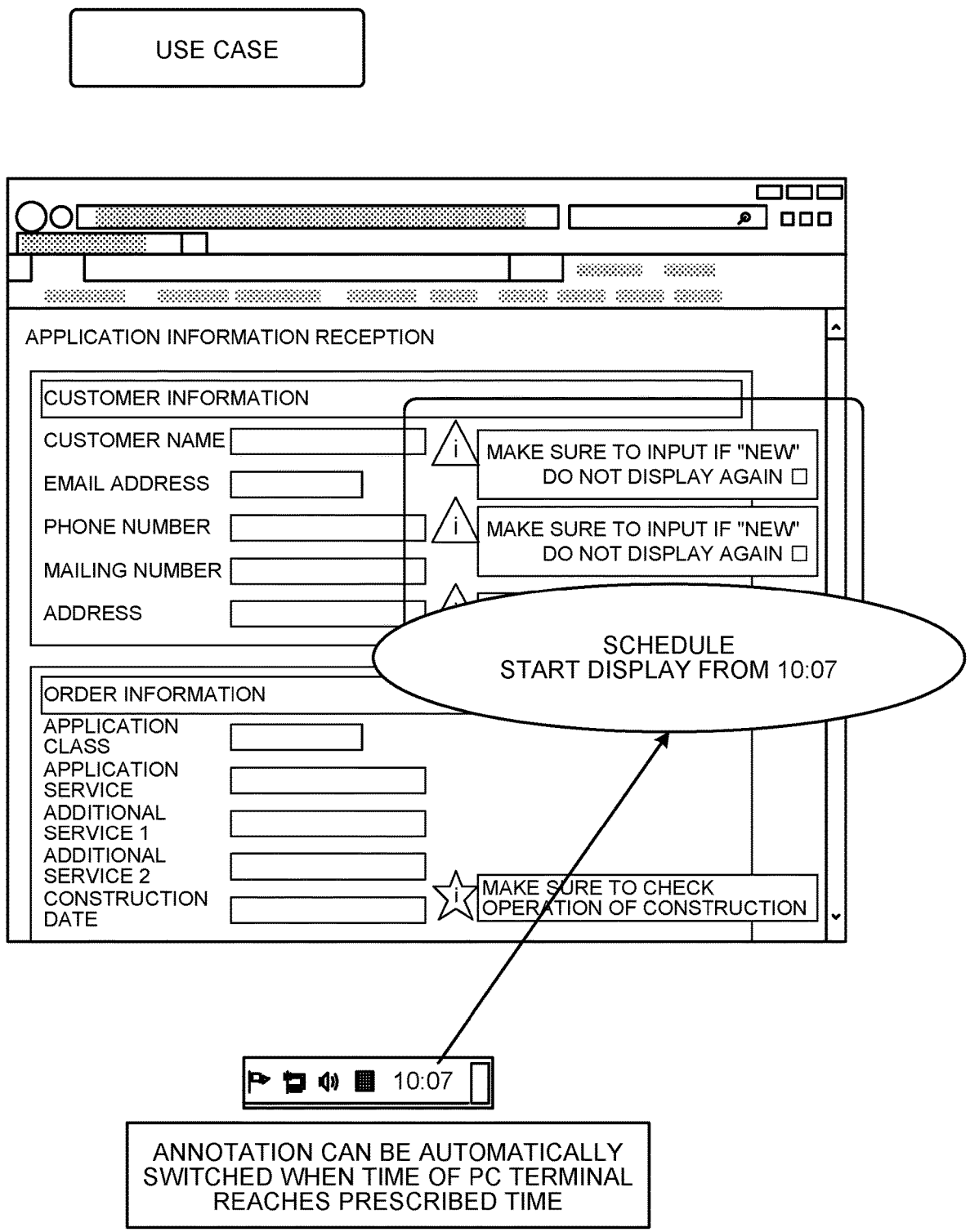
FIG. 24 is an explanatory diagram for describing the example of display control processing performed by the display control apparatus.

FIG. 24 illustrates a case of displaying annotation in a period registered in a schedule. For example, as illustrated in FIG. 24(a), the display control apparatus 10 can display annotation at a specific date and time for support of regular operation such as operation at the end of a month. For example, even when a user is away from the desk at the moment, annotation can be forcibly and automatically displayed at a scheduled time.

Figure 24B:
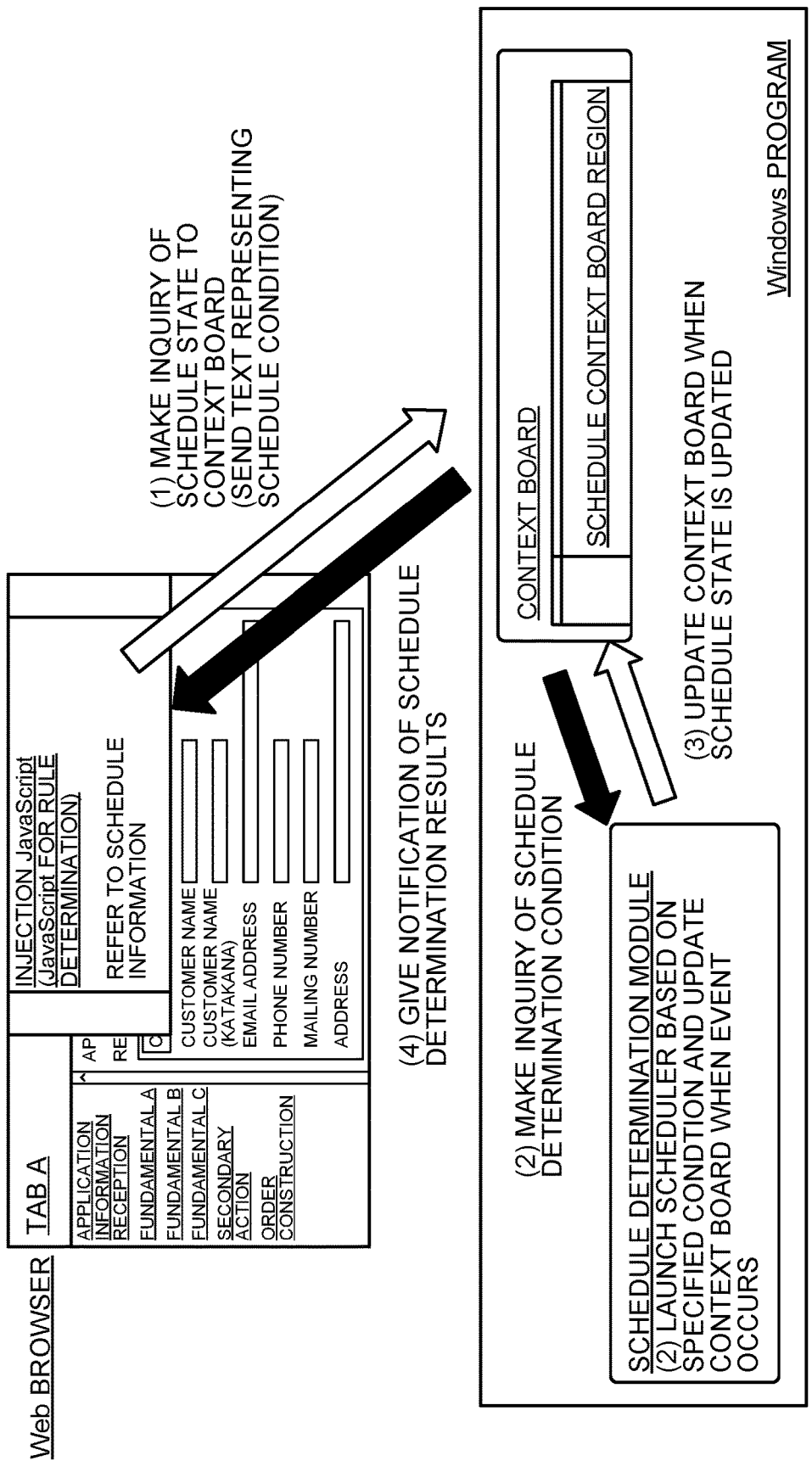

In this case, as illustrated in FIG. 24(b), the control unit 15 creates the rule 14a including a fact that the time of a PC has reached predetermined time in an operation scene. The rule interpretation execution unit 15c generates an object representing time inside a PC, and sets evaluation results for the annotation rule specified with predetermined time being a condition. In this manner, the display control apparatus 10 can display annotation in a period registered in a schedule.

Figure 25A:
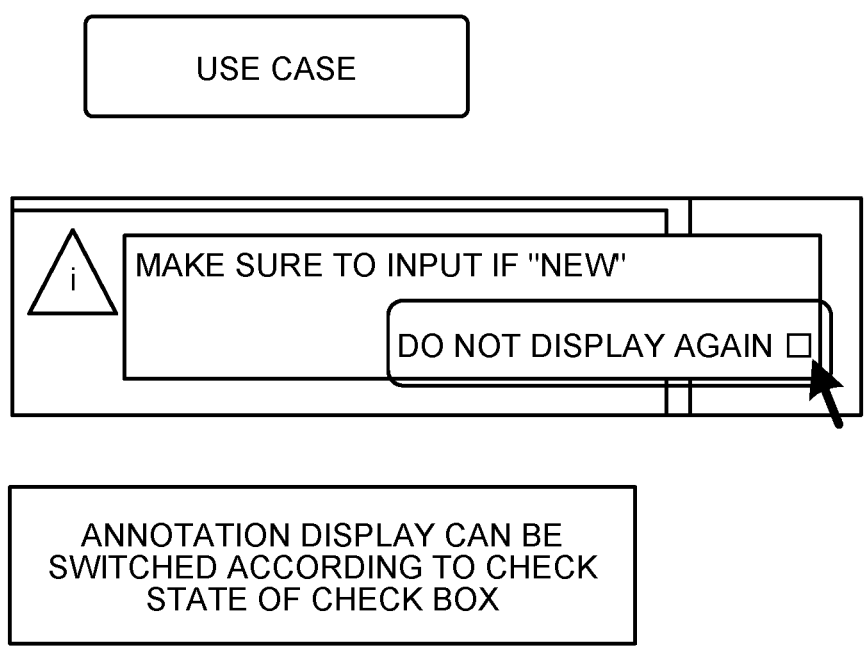
FIG. 25 is an explanatory diagram for describing the example of display control processing performed by the display control apparatus.

FIG. 25 illustrates a case of switching the second or later annotation display for a user to non-display. As illustrated in FIG. 25(a), the display control apparatus 10 can switch the second or later annotation display for a user to non-display by using annotation with a check box with which the user specifies do not display again".

In this case, the control unit 15 uses annotation with a check box for specifying "do not display again" to receive command input of a user of changing the second or later annotation to non-display. The control unit 15 creates the rule 14a including a fact that the check box of the annotation has been checked in an operation scene.

Figure 25B:
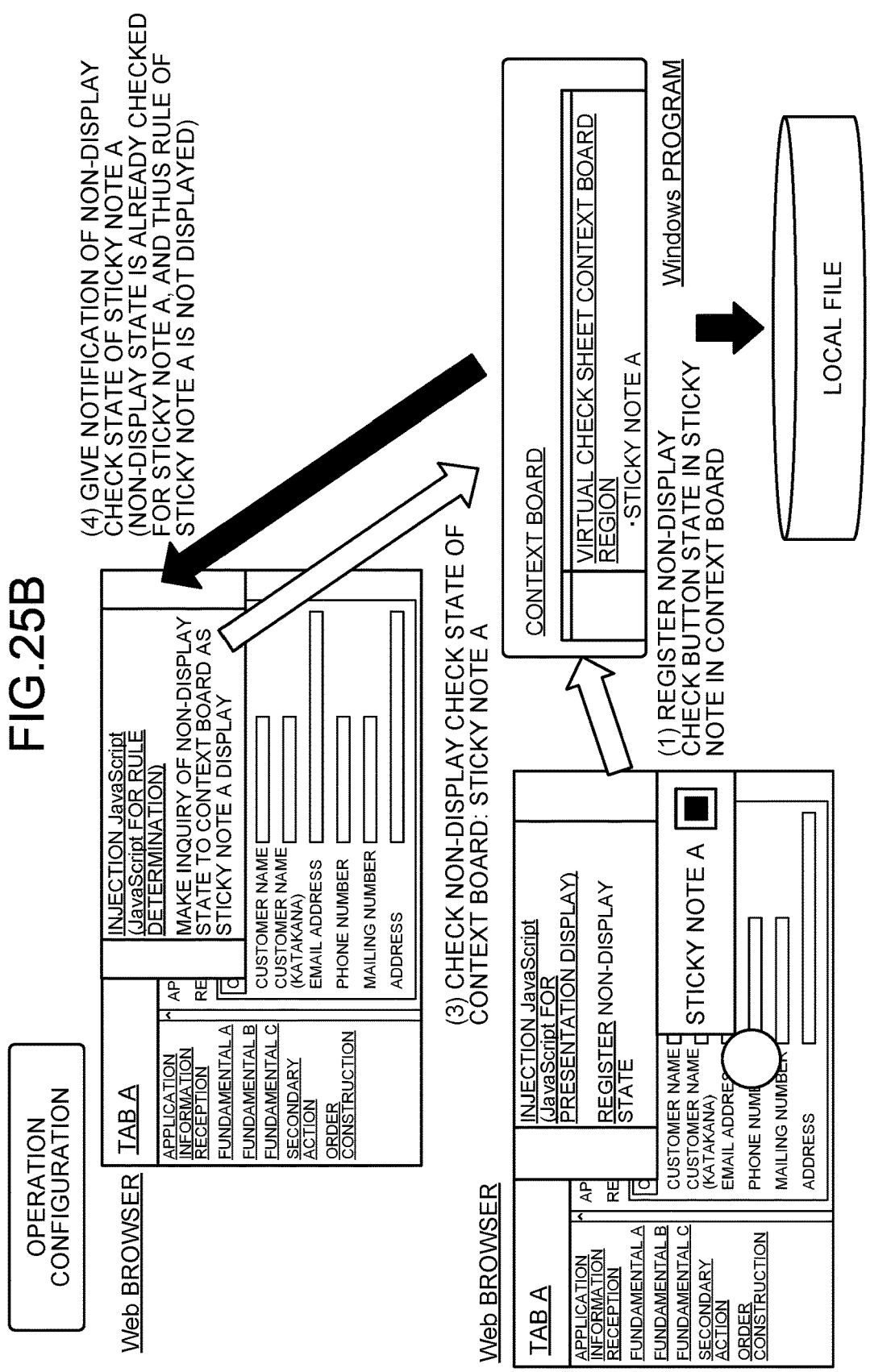

As illustrated in FIG. 25(b), the rule interpretation execution unit 15c generates an object representing a check state of the annotation for the context board (non-display check), and sets evaluation results for the annotation rule specified with the checked state being a condition. In this manner, the display control apparatus 10 can switch the second or later annotation display for a user to non-display permanently.

Figure 26:
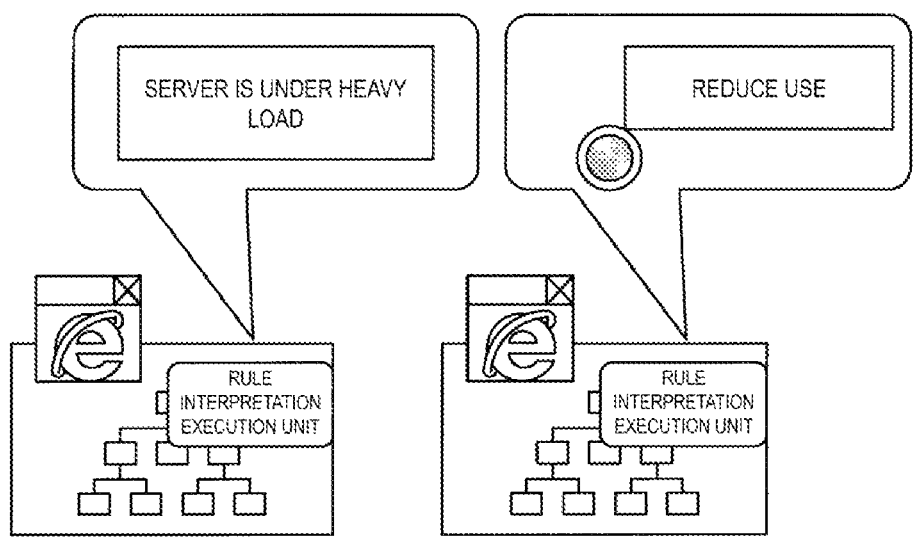
FIG. 26 is an explanatory diagram for describing the example of display control processing performed by the display control apparatus.

FIG. 26 illustrates annotation display when a label "server is under heavy load" is present in a certain window. This case corresponds to an operation scene in which operation is performed in a search window different from a window for monitoring a system operation status.

In this case, according to the display control apparatus 10, annotation "reduce use" can be displayed next to a search button of a search window. In this manner, the display control apparatus 10 can share contexts among windows with a different reference source and reference destination, such as a window of a reference source used for determining a system operation status and a search window used for reference of determination results.

Program A program in which the processing executed by the display control apparatus 10 according to the aforementioned embodiments is described in a computer-executable language can also be created. In an embodiment, the display control apparatus 10 can be implemented by causing a desired computer to install the display control program configured to execute the aforementioned display control processing as packaged software or on-line software. For example, it is possible to cause an information processing apparatus to function as the display control apparatus 10 by causing the information processing apparatus to execute the aforementioned display control program. The information processing apparatus described here includes a desktop or laptop personal computer. In addition, a mobile communication terminal such as a smart phone, a mobile phone, or a Personal Handyphone System (PHS) and a slate terminal such as a Personal Digital Assistant (PDA) are included in the category of the information processing apparatus.

The display control apparatus 10 can be implemented as a server apparatus that provides services related to the aforementioned display control processing to a client that is a terminal device used by a user. For example, the display control apparatus 10 is implemented as a server apparatus that provides display control processing services for receiving input of a web page and outputting display of additional information. In this case, the display control apparatus 10 may be implemented as a web server or may be implemented as a cloud configured to provide services related to the aforementioned display control processing through outsourcing.

Hereinafter, an example of a computer that executes the display control program that implements functions that are similar to those of the display control apparatus 10 will be described.

Figure 27:
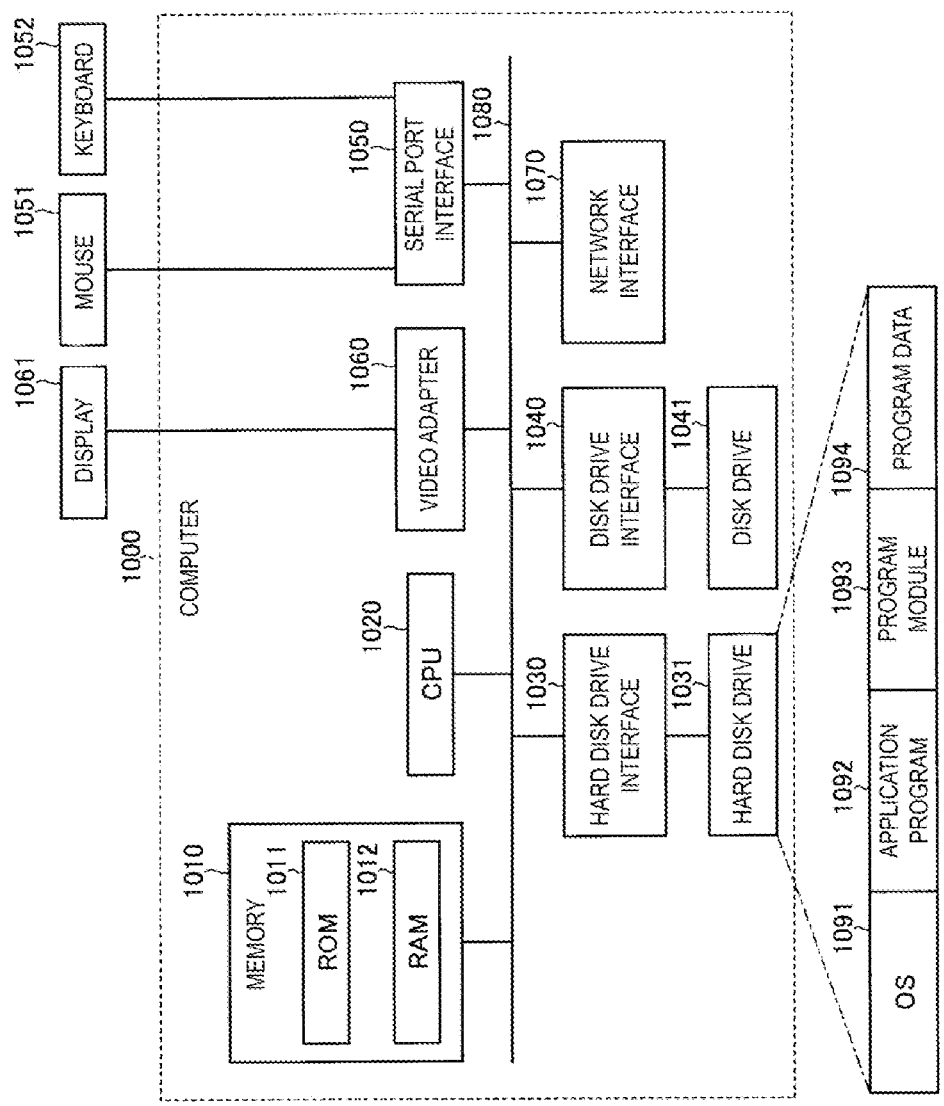
FIG. 27 is a diagram illustrating a computer that executes a display control program.

FIG. 27 is a diagram showing an example of the computer that executes the display control program. A computer 1000 has, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes Read Only Memory (ROM) 1011 and a RAM 1012. The ROM 1011 stores a boot program, such as Basic Input Output System (BIOS), for example. The hard disk drive interface 1030 is connected to the hard disk drive 1031. The disk drive interface 1040 is connected to a disk drive 1041. A detachable storage medium such as a magnetic disk or an optical disc, for example, is inserted into the disk drive 1041. A mouse 1051 and a keyboard 1052, for example, are connected to the serial port interface 1050. A display 1061, for example, is connected to the video adapter 1060.

Here, the hard disk drive 1031 stores, for example, an OS 1091, an application program 1092, a program module 1093, and program data 1094. The respective information described in the aforementioned embodiments are stored in, for example, the hard disk drive 1031 and the memory 1010.

The display control program is stored in the hard disk drive 1031 as, for example, the program module 1093 in which commands executed by the computer 1000 are described.

Specifically, the program modules 1093 in which the respective processing executed by the display control apparatus 10 as described in the aforementioned embodiments are described are stored in the hard disk drive 1031.

The data used in information processing performed using the display control program is stored as the program data 1094 in the hard disk drive 1031, for example. Then, the CPU 1020 reads the program module 1093 and the program data 1094 stored in the hard disk drive 1031 as needed in the RAM 1012 and executes each of the aforementioned procedures.

Note that the program module 1093 and the program data 1094 related to the display control program are not limited to the case in which they are stored in the hard disk drive 1031 and may be stored in a detachable storage medium, for example, and may be read by the CPU 1020 via the disk drive 1041, or the like. Alternatively, the program module 1093 or the program data 1094 relating to the display control program may be stored in another computer connected via a network such as Local Area Network (LAN) or a Wide Area Network (WAN) and be read by the CPU 1020 through the network interface 1070.

Although the embodiments to which the invention made by the present inventors is applied have been described above, the invention is not limited by the description and the drawings as a part of the disclosure of the present invention according to the embodiments. In other words, all of other embodiments, examples, operation technologies, and the like made by those skilled in the art based on the embodiments are within the scope of the invention.

REFERENCE SIGNS LIST

10 Display control apparatus
11 Input unit
12 Output unit
13 Communication control unit
14 Storage unit
14*a* Rule
14*b* Context board
15 Control unit
15*a* Target acquisition unit
15*b* Connection unit
15*c* Rule interpretation execution unit
15*d* Editing unit

The invention claimed is:

1. A display control apparatus comprising:
a memory; and
a processor coupled to the memory and programmed to execute a process comprising:
creating or editing a set of rules by using a graphical user interface (GUI), wherein the set of rules specify additional information to be displayed for an operation scene identified with a combination of states of a set of document object model (DOM) elements of a predetermined web page being represented by presence/absence or attribute values, wherein creating or editing the set of rules, using the GUI in which the operation scene is visualized, comprises:

displaying, in the GUI, the set of DOM elements, an image picture of the predetermined web page, and a correspondence between regions of the predetermined web page and each of the set of DOM elements, receiving a selected DOM element, and receiving, one or more rules, included in the set of rules, that specify the additional information to be displayed for the selected DOM element;

storing the set of rules corresponding to the set of DOM elements of the predetermined web page, wherein the set of rules are combined with a parent-child relationship in a tree structure, and the additional information to be displayed is exclusively set in rules serving as leaves of the tree structure;

monitoring the states of the set of DOM elements of the predetermined web page, and storing the states as a context board; and displaying, if states of the operation scene match the stored states of the context board, the additional information specified with the set of rules.

2. The display control apparatus according to claim 1, wherein when the monitored states of the DOM elements change, displaying, if the states of the operation scene match the states of the context board, the additional information specified with the set of rules.

3. The display control apparatus according to claim 1, wherein the process further comprises:

storing the set of rules further including a state external to the predetermined web page in the operation scene, and further monitoring the state external to the predetermined web page.

4. The display control apparatus according to claim 1, wherein editing includes inline frames, and uses the GUI in which each of the inline frames is identified as a web page having different uniform resource locators (URLs).

5. The display control apparatus according to claim 1, wherein when a DOM element being a target of the set of rules is selected, editing uses the GUI in which a default value of the DOM element is displayed.

6. A display control method executed in a display control apparatus including a storage unit that stores a set of rules for specifying additional information to be displayed for an operation scene identified with a combination of states of a set of DOM elements of a predetermined web page being represented by presence/absence or attribute values, the display control method comprising:

creating or editing the set of rules by using a graphical user interface (GUI), wherein creating or editing the set of rules, using the GUI in which the operation scene is visualized, comprises:
- displaying, in the GUI, the set of DOM elements, an image picture of the predetermined web page, and a correspondence between regions of the predetermined web page and each of the set of DOM elements,
- receiving a selected DOM element, and
- receiving, one or more rules, included in the set of rules, that specify the additional information to be displayed for the selected DOM element, wherein the set of rules corresponds to the set of DOM elements of the predetermined web page, the set of rules are combined with a parent-child relationship in a tree structure, and the additional information to be displayed is exclusively set in rules serving as leaves of the tree structure;

monitoring the states of the set of DOM elements of the predetermined web page, and causing the storage unit to store the states as a context board; and displaying, if states of the operation scene matching states of the context board stored in the storage unit, the additional information specified with the set of rules.

7. The display control method according to claim 6, wherein when the monitored states of the DOM elements change, displaying, if the states of the operation scene match the states of the context board, the additional information specified with the set of rules.

8. The display control method according to claim 6, further comprising:
- storing the set of rules further including a state external to the predetermined web page in the operation scene, and
- further monitoring the state external to the predetermined web page.

9. The display control method according to claim 6, wherein
- editing includes inline frames, and uses the GUI in which each of the inline frames is identified as a web page having different uniform resource locators (URLs).

10. The display control method according to claim 6, wherein
- when a DOM element being a target of the set of rules is selected, editing uses the GUI in which a default value of the DOM element is displayed.

11. A non-transitory computer-readable recording medium having stored thereon a display control program that refers to a storage unit that stores a set of rules for specifying additional information to be displayed for an operation scene identified with a combination of states of a set of DOM elements of a predetermined web page being represented by presence/absence or attribute values, the display control program causing a computer to execute:
- creating or editing a set of rules by using a graphical user interface (GUI),
- wherein creating or editing the set of rules, using the GUI in which the operation scene is visualized, comprises:
  - displaying, in the GUI, the set of DOM elements, an image picture of the predetermined web page, and a correspondence between regions of the predetermined web page and each of the set of DOM elements,
  - receiving a selected DOM element, and
  - receiving, one or more rules, included in the set of rules, that specify the additional information to be displayed for the selected DOM element, wherein the set of rules corresponds to the set of DOM elements of the predetermined web page, the set of rules are combined with a parent-child relationship in a tree structure, and the additional information to be displayed is exclusively set in rules serving as leaves of the tree structure;

monitoring the states of the set of DOM elements of the predetermined web page, and causing the storage unit to store the states as a context board; and displaying, if states of the operation scene matching states of the context board stored in the storage unit, the additional information specified with the set of rules.

12. The non-transitory computer-readable recording medium according to claim 11, wherein
when the monitored states of the DOM elements change, displaying, if the states of the operation scene match the states of the context board, the additional information specified with the set of rules.

13. The non-transitory computer-readable recording medium according to claim 11, wherein the display control program further causes the computer to execute:
- storing the set of rules further including a state external to the predetermined web page in the operation scene, and
- further monitoring the state external to the predetermined web page.

14. The non-transitory computer-readable recording medium according to claim 11, wherein
- editing includes inline frames, and uses the GUI in which each of the inline frames is identified as a web page having different uniform resource locators (URLs).

15. The non-transitory computer-readable recording medium according to claim 11, wherein
- when a DOM element being a target of the set of rules is selected, editing uses the GUI in which a default value of the DOM element is displayed.

* * * * *